(12) United States Patent  (10) Patent No.: US 8,177,408 B1
Coleman  (45) Date of Patent: May 15, 2012

(54) LIGHT FILTERING DIRECTIONAL CONTROL ELEMENT AND LIGHT FIXTURE INCORPORATING THE SAME

(75) Inventor: Zane Coleman, Somerville, MA (US)

(73) Assignee: Fusion Optix, Inc.

( * ) Notice: Subject to any disclaimer, the term of this patent is extended or adjusted under 35 U.S.C. 154(b) by 187 days.

(21) Appl. No.: 12/371,613

(22) Filed: Feb. 15, 2009

Related U.S. Application Data

(60) Provisional application No. 61/028,905, filed on Feb. 15, 2008.

(51) Int. Cl.
*F21V 7/04* (2006.01)

(52) U.S. Cl. ......... 362/615; 362/616; 362/617; 362/621

(58) Field of Classification Search .......... 362/615–629; 385/33, 35, 39, 129, 130, 131, 132
See application file for complete search history.

(56) References Cited

U.S. PATENT DOCUMENTS

| | | | |
|---|---|---|---|
| 4,993,806 A * | 2/1991 | Clausen et al. ............... | 359/456 |
| 5,384,641 A * | 1/1995 | Imura ........................... | 356/446 |
| 5,396,406 A | 3/1995 | Ketchpel | |
| 5,598,281 A | 1/1997 | Zimmerman | |
| 5,839,812 A | 11/1998 | Ge | |
| 5,839,823 A | 11/1998 | Hou | |
| 6,317,263 B1 * | 11/2001 | Moshrefzadeh et al. ...... | 359/443 |
| 6,327,091 B1 | 12/2001 | Agano | |
| 6,633,351 B2 | 10/2003 | Hira | |
| 6,816,312 B2 | 11/2004 | Oda | |
| 6,869,195 B2 * | 3/2005 | Hannington .................. | 359/614 |
| 6,876,408 B2 | 4/2005 | Yamaguchi | |
| 7,262,912 B2 | 8/2007 | Wood | |
| 7,309,149 B2 | 12/2007 | Lee | |
| 2002/0109915 A1 * | 8/2002 | Mori et al. .................... | 359/455 |
| 2003/0072080 A1 * | 4/2003 | Ariyoshi et al. .............. | 359/487 |
| 2004/0004770 A1 * | 1/2004 | Ebina et al. ................... | 359/648 |
| 2005/0180690 A1 * | 8/2005 | Sugiyama et al. ............. | 385/33 |
| 2006/0056022 A1 * | 3/2006 | Yeo et al. ...................... | 359/460 |
| 2006/0061869 A1 | 3/2006 | Fadel | |
| 2007/0002452 A1 | 1/2007 | Munro | |
| 2007/0236940 A1 | 10/2007 | Kuroda | |

FOREIGN PATENT DOCUMENTS

WO 2008/008994 A2 1/2008

OTHER PUBLICATIONS

Olviver Dross et al., "A superior architecture of brightness enhancement for display backlighting," Proceedings of Nonimaging Optics and Efficient Illumination System III, ed by Roland Winston, SPIE vol. 6338, (2006).

(Continued)

*Primary Examiner* — Anabel Ton
*Assistant Examiner* — Danielle Allen

(57) ABSTRACT

In one embodiment of this invention, a light filtering directional control element provides increased spatial color or luminance uniformity and desired angular color uniformity and customizable light re-direction properties. In one embodiment of this invention, a light filtering directional control element directs light off-axis and focuses light in the far field. In a further embodiment of this invention a light fixture comprising the light filtering collimation element has a spatial luminance uniformity greater than 80%, a color uniformity Δu'v' of less than 0.04 and a short mixing distance. In a further embodiment, the light fixture incorporating the element has electronically or manually configurable light output profile.

18 Claims, 8 Drawing Sheets

OTHER PUBLICATIONS

Patent Abstracts of Japan for 2000-284268, Takahashi Susumu, published Oct. 13, 2000.
Patent Abstracts of Japan for 2005-221619, Sato Atsushi, published Aug. 18, 2005.
Patent Abstracts of Japan for 2006-030537, Sato Atsushi, published Feb. 2, 2006.
Patent Abstracts of Japan for 2006-284697, Luis M Murillo-Mora, published Oct. 19, 2006.
Patent Abstracts of Japan for 2006-344546, Kuroda Kenjiro, published Dec. 21, 2006.
Patent Abstracts of Japan for 2007-003908, Luis M Murillo-Mora, published Nov. 1, 2007.
Patent Abstracts of Japan for 2007-047257, Kuroda Kenjiro, published Feb. 22, 2007.
Patent Abstracts of Japan for 2007-065268, Kitazawa Minoru, published Mar. 15, 2007.
Patent Abstracts of Japan for 2007-199453, Nakagome Tomohiro, published Aug. 9, 2007.
Patent Abstracts of Japan for 2007-225853, Luis M Murillo-Mora, published Sep. 6, 2007.
Patent Abstracts of Japan for 2007-292875, Nakagome Tomohiro, published Nov. 8, 2007.
Patent Abstracts of Japan for 2007-304398, Fukunaga Satohiro, published Nov. 22, 2007.
Patent Abstracts of Japan for 2007-304460, Okubo Masaru, published Nov. 22, 2007.

* cited by examiner

LIGHT FILTERING DIRECTIONAL CONTROL ELEMENT AND LIGHT FIXTURE INCORPORATING THE SAME

RELATED APPLICATIONS

This applications claims the benefit of U.S. Provisional Application No. 61/028,905, filed on Feb. 15, 2008, the entire contents is incorporated herein by reference.

FIELD OF THE INVENTION

This invention generally relates to optical components for improving the uniformity, appearance, form factor, and light output distribution or direction and in light emitting devices incorporating the components such as light fixtures and backlights.

BACKGROUND OF THE INVENTION

Light collimating films can be used in light fixtures to collimate the light and increase uniformity through total internal reflections. Traditional prismatic collimation films have limitations on their ability to highly collimate the incident light. Current methods for improving the uniformity of light in light fixture often involve excess diffusion, light absorption and generally the thickness of the fixture is increased or the mixing distance is substantially high.

SUMMARY OF THE INVENTION

In one embodiment of this invention, a light filtering directional control element provides increased spatial color or luminance uniformity and desired angular color uniformity and customizable light re-direction properties. In one embodiment of this invention, a light filtering directional control element directs light off-axis and focuses light in the far field. In a further embodiment of this invention a light fixture comprising the light filtering collimation element has a spatial luminance uniformity greater than 80%, a color uniformity $\Delta u'v'$ of less than 0.04 and a short mixing distance. In a further embodiment, the a light fixture incorporating the element has electronically or manually configurable light output profile.

DETAILED DESCRIPTION OF THE INVENTION

Figure 1:
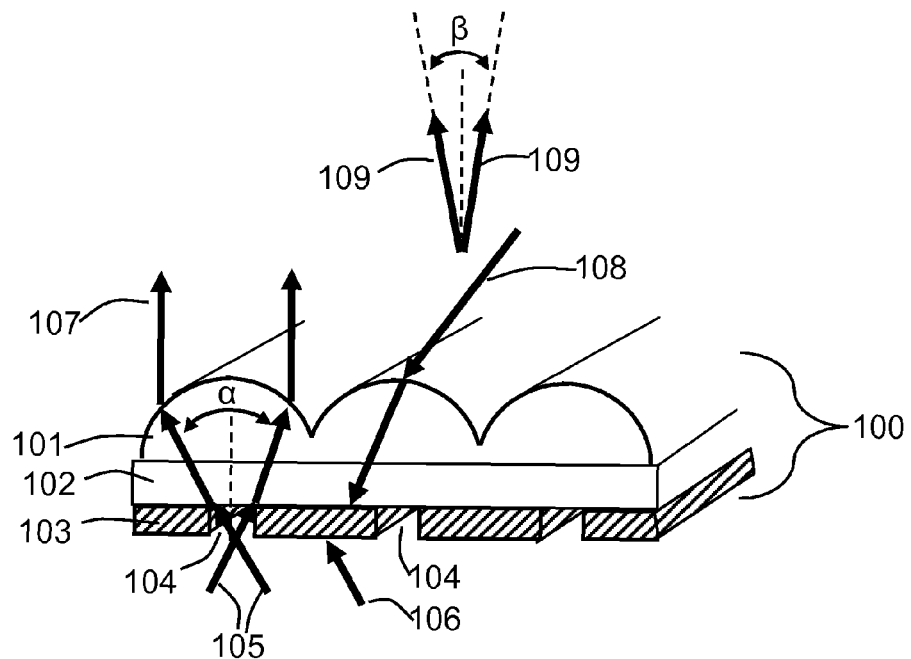
FIG. 1 is a perspective view of a light filtering directional control element of one embodiment of this invention comprising a light reflecting region.

The features and other details of the invention will now be more particularly described. It will be understood that particular embodiments described herein are shown by way of illustration and not as limitations of the invention. The principal features of this invention can be employed in various embodiments without departing from the scope of the invention. All parts and percentages are by weight unless otherwise specified.

Definitions

For convenience, certain terms used in the specification and examples are collected here.

"Speckle", often referred to also as scintillation, includes the optical interference pattern visible on a scattering element or perceived as coming from or near a scattering element. This can include color or intensity variations within an small area of interest.

"Speckle Contrast" is defined herein to include the ratio of the standard deviation of the intensity fluctuation to the mean intensity over the area of interest.

"Scatter," "Scattering," "Diffuse" and "Diffusing" as defined herein includes light scattering by reflection, refraction or diffraction from particles, surfaces, or layers.

"Optically coupled" is defined herein as including the coupling, attaching or adhering two or more regions or layers such that the intensity of light passing from one region to the other is not substantially reduced due to Fresnel interfacial reflection losses due to differences in refractive indices between the regions. Optical coupling methods include joining two regions having similar refractive indices, or by using an optical adhesive with a refractive index substantially near or in-between the regions or layers such as Optically Clear Adhesive 8161 from 3M (with a refractive index at 633 nm of 1.474). Examples of optically coupling include lamination using an index-matched optical adhesive such as a pressure sensitive adhesive; coating a region or layer onto another region or layer; extruding a region or layer onto another region or layer; or hot lamination using applied pressure to join two or more layers or regions that have substantially close refractive indices. A "substantially close" refractive index difference is about 0.5, 0.4, 0.3 or less, e.g., 0.2 or 0.1.

"Diffusion angle" is a measurement of the angular diffusion profile of the intensity of light within a plane of emitted light. Typically the diffusion angle is defined according to an angular Full-Width-at-Half-Maximum (FWHM) intensity defined by the total angular width at 50% of the maximum intensity of the angular light output profile. For diffusive films and sheets, this is typically measured with collimated incident light at a specific wavelength or white light. Typically, for anisotropic diffusers, the FWHM values are specified in two orthogonal planes such as the horizontal and vertical planes orthogonal to the plane of the film. For example, if angles of +35° and −35° were measured to have one-half of the maximum intensity in the horizontal direction, the FWHM diffusion angle in the horizontal direction for the diffuser would be 70°. Similarly, the full-width at one-third maximum and full-width at one-tenth maximum can be measured from the angles at which the intensity is one-third and one-tenth of the maximum light intensity respectively.

The "asymmetry ratio" is the FWHM diffusion angle in a first light exiting plane divided by the FWHM diffusion angle in a second light exiting plane orthogonal to the first, and thus is a measure of the degree of asymmetry between the intensity profile in two orthogonal planes of light exiting the diffuser.

A "spheroidal" or "symmetric" particle includes those substantially resembling a sphere. A spheroidal particle may contain surface incongruities and irregularities but has a generally circular cross-section in substantially all directions. A spheroid is a type of ellipsoid wherein two of the 3 axes are equal. An "asymmetric" particle is referred to here as an "ellipsoidal" particle wherein each of the three axis can be a different length. Ellipsoidal particles can range in shapes from squashed or stretched spheres to very long filament like shapes.

"Planarized," "Planarization," and "Planar," includes creating a substantially flat surface on an element. A flat surface refers to one that does not have a substantially varying surface normal angle across a surface of the element. More than one surface may be planarized. As typically used herein, a material region is combined with a surface of an element that has a surface structure such that the surface of the material opposite the element is substantially planar. Typically, planarized films or components can be easily laminated to another element using pressure sensitive adhesives or hot-lamination without trapping air bubbles of sufficient size to affect the optical performance of the combined element. Coatings, such as thin coatings used in some anti-reflection coatings can be applied more uniformly to planarized elements.

In a first embodiment of this invention, a light filtering directional control element comprises light absorbing regions, light transmitting apertures disposed on a first side of a substrate and a lenticular lens surface array surface relief profile disposed on the second side of the substrate. The spacing, width, transmissivity, aperture ratio, substrate thickness, lenticule profile (spherical, aspherical, conic, etc), lenticule pitch, refractive index, etc. are designed to redirect light transmitted through the light transmitting apertures from a first angular range in a first collimating plane and refract the transmitted light into a second angular range less than the first angular range such that the film has a higher degree of collimation. Additionally, the aforementioned properties of the light filtering collimating film may be chosen to provide spatial light filtering properties which reduce the appearance of blemishes, or other non-uniformities. In a further embodiment of this invention, the light transmitting regions are apertures disposed within a light absorbing layer off of the axis of the lenses such that the light reaching the refractive lenticular structures is redirected into a second angular range such that the peak intensity is off-axis and the angle of peak intensity, theta, is greater than zero degrees to the normal to the exiting plane of the film or exit surface of a light fixture. In another embodiment of this invention, the diffuse reflectance of the light emitting surface of the light filtering directional control element or light fixture comprising the same, which comprises the refractive surface of the lenticular lens array is less than 50% such that the light emitting device maintains a gray, dark silver, or black appearance when illuminated from the light exiting side. In a further embodiment, the diffuse reflectance (d/8) of the light emitting region of the light emitting device is less than 20% such that the visibility or contrast of blemishes, yellowing, dirt, etc are minimized when the light emitting device is not emitting light in a off state. In a further embodiment, the light emitting device is less conspicuous and provides less reflectance of ambient light. This is useful in situations where it is desired to have a higher visibility contrast of other items in room such as people or equipment in military conditions where infrared secondary illumination is used. In a military application such as a cockpit in a night vision mode where the pilots are using infrared to view documents, maps, etc, there is very little stray reflection of light from the light emitting device of this invention due to the ambient light (IR and visible) being absorbed and not scattered nor reflected back from the light fixture. This provides increased clarity and contrast and reduces the visibility of stray light outside the cockpit or reflected off of the canopy. Similarly, in another embodiment of this invention, a light fixture with a diffuse reflectance of less than 50% is installed in a movie theatre. By employing light fixtures with a low reflectance, less light from the screen is reflected from the light fixture back onto the screen where it reduces the image contrast. Also, in situations where emergency exit illumination is required, the light from the fixture can be directed into a angular region while the appearance of the fixture is less visible (such as black or dark in a dark room) and is not distracting.

In one embodiment of this invention a method for producing a light absorbing layer comprises the steps of depositing a light absorbing material on a lenticular lens array film and further depositing a light reflecting material on the light absorbing material. Light transmitting apertures are formed within the light absorbing layer and the light reflecting layer through laser ablation. The width, location, thickness, and transmissivity of the apertures are designed to provide a predetermined angular light output profile, uniformity and appearance when viewed from a direction opposite that of the input light.

In one embodiment of this invention, a light filtering directional control element comprises a lenticular lens surface profile, light reflecting regions disposed to receive light and reflect a portion of the incident light and light transmitting regions disposed in-between or within the light reflecting regions disposed to transmit a portion of the incident light. A portion of the light incident on the light reflecting layer is transmitted through the light reflecting layer and reaches the light absorbing layer and is substantially absorbed. The portion of the incident light which is transmitted through the light transmitting regions reaches the lenticules wherein the first angular bundle of rays of a second predetermined angular width is refracted into a second angular bundle of rays of a second predetermined angular width wherein the second angular width is less than the first in a plane perpendicular to the lenticules.

In one embodiment of this invention a light filtering directional control element comprises a surface relief lenticular lens array, light transmitting regions disposed to transmit light from a predetermined angular range and at least one of a light absorbing or light reflecting region.

In a further embodiment of this invention, an optical element comprises an input surface, an output surface, first light transmitting regions, first light blocking regions, a first group of lenticular elements formed in a first light transmitting material with first lenticular apexes and first optical axes, a light transmitting layer disposed in an optical path between the input surface and the first group of lenticular elements comprising the first light blocking regions disposed in-between the first light transmitting regions, a first angle gamma, defined as the angle between the line formed between the apexes of the first group of lenticular elements and the center of the light transmitting regions and the optical axes of the first group of lenticular elements wherein the first group of light blocking regions are disposed to intersect the optical axes of the first group of lenticular elements and gamma is greater than 5 degrees.

Lenticular Structure

In one embodiment of this invention, the lenticular lens array surface relief structure comprise a substantially linear array of convex refractive elements which redirect light from a first angular range into a second angular range. As used herein, a lenticular elements or structures include, but are not limited to elements with cross-sectional surface relief profiles where the cross-section structure is hemispherical, aspherical, conical, triangular, rectangular, polygonal, or in the form of an arc or other parametrically defined curve or polygon or combination thereof. Lenticular structures may be linear arrays, two-dimension arrays such as a microlens array, close-packed hexagonal or other two-dimensional array. The features may employ refraction along with total internal reflection such that the output angular range is less than the input angular range within one or more exiting light planes. Lenticular structures may also be used to redirect light to an angle substantially off-axis from the optical axis of the element. As used herein, lenticular may refer to any shape of element which refracts or reflects light through total internal reflection and includes elements referred to as "non-lenticular" in U.S. Pat. No. 6,317,263, the contents of which are incorporated by reference herein. The lenticular structure may be disposed on a supporting substrate. In one embodiment, the focal point of the structures is substantially near the opposite surface of the supporting substrate. The lenticular element may have a first focal point in the near field and a group of lenticular elements may collectively have a far-field focal point defined as a region where the spatial cross-sectional area of the light flux is at a minimum. The material, methods of making and structures of lenticular lens arrays, microlens arrays, prismatic films, etc. are known in the art of backlights, projection screens and lenticular and 3D imaging.

In one embodiment of this invention, the light filtering directional control element comprises more than one lenticular structure disposed on the same or opposite side of a substrate. A light filtering directional control element with a lenticular element disposed on the input surface can focus more light through the light transmitting regions and change the direction or FWHM angular width of the light output profile from the light filtering directional control element. The structures can be convex or concave and similar to those used in double-lenticular rear projections screens such as those described in U.S. Pat. Nos. 5,611,611, 5,675,434, 5,687,024, 6,034,817, 6,940,644, and 5,196,960, the contents of which are incorporated herein by reference. The design of the lenticular shape on one or more surfaces is not limited to these features and includes other designs known in the rear-projection screen and lenticular imaging industry and the design may include those referenced in other patents referred to in other sections of this application and incorporated by reference herein.

Substantially clear lens substrates are known in the art and are used in the production of lenticular screens for rear-projection screens. In one embodiment of this invention, a volumetric diffuser is used as the supporting substrate. In this embodiment, the number of films may be reduced or the thickness reduces by alleviating or reducing the need for a substrate which is not optically active and replacing it with a diffuser which improves the uniformity. By using an anisotropic volumetric diffuser (which scatters light into higher angles in a first output plane parallel to the lenticules, and has very little or on effect on the scattering of light along the plane perpendicular to the lenticules), the focusing or collimating power of the lenticular lens array in the second light output plane perpendicular to the lenticules can be maintained while the spatial luminance uniformity of the light emitting device is improved. In one embodiment of this invention, the angular FWHM of the diffusion profile of the anisotropic diffuser used as the lenticular lens array substrate in the plane parallel to the lenticules is greater than one selected from the group of 5, 10, 20, 30 and 50 and the angular FWHM of the diffusion profile of the anisotropic diffuser used as the lenticular lens array substrate in the plane perpendicular to the lenticules is less than one selected from the group of 10, 5, 4, 2, and 1. In a further embodiment, the asymmetry ratio of the anisotropic light scattering diffuser disposed as a substrate to the lenticular lens array in a light filtering directional control element is greater than one selected from the group 5, 10, 20, 40, 50, and 60. Additionally, the FWHM of the total scattering angles in the first and second output planes of a light fixture comprising the light filtering directional control element of one embodiment of this invention can be independently controlled by use of an anisotropic diffuser. In a further embodiment of this invention, a light filtering directional control element comprises a lenticular lens array wherein the lenticular lenses have a conformal low refractive index region disposed on the curved surface of the lenticule such that the output surface is substantially planarized. In a further embodiment of this invention, the output surface of a planarized light filtering directional control element is the output surface, or a substantially co-planar surface coupled to a protective lens our output surface of a light fixture.

In another embodiment of this invention, a light filtering directional control element comprises a layer of beads, at least one of a light transmitting region or light reflecting region disposed to refract incident light from a light transmitting region disposed between or substantially within in at least one of the light transmitting or light reflecting regions. Analogous to the lenticular lens array, an array comprising a randomized assortment of beads may be used to collimate or substantially reduce the angular extent of light exiting from a light transmitting region and filter the light. The primary differences include the fact that the bead type light filtering directional control element will reduce the angular extent of the output light in all planes of the output light normal to the exiting surface. However, the ability to achieve very high levels of collimation is limited and the fill-factor, and ultimate transmission is limited due to the cross-sectional area limitations of close-packing an array of spheres (or hemispheres or spheroidal lens-like structures). In another embodiment of this invention, a light filtering directional control element comprises lenticular or bead based elements and light transmitting regions and light absorbing regions in common with rear projection screens such as those described elsewhere herein and those described in 6,466,368, except that when used with projection screens, the input light is typically collimated or of a reduced angular extent and is incident first upon the lenticular or bead elements and the output light is of a larger angular extent and exits through the light transmitting apertures. In on embodiment of the present invention, the incident light has an angular FWHM greater than 30 degrees and is incident first on the light transmitting regions and the output light has a reduced angular extent and exits through the lenticular or bead based refractive elements.

Common materials such as those used to manufacture lenticular screens such as vinyl, APET, PETG, or other materials described in patents referenced elsewhere herein may be used in the present invention for a light filtering directional control element. In a further embodiment, a material capable of surviving temperature exposures higher than 85 degrees Celsius may used as the lenticular lens or substrate to the lenticular lens or bead based element such as biaxially oriented PET or polycarbonate. By using a material capable of withstanding high temperature exposure, manufacturing processes such has heating during a pressure application stage or heating during an exposure stage may be used to decrease the production time.

Pitch of the Lenticular Structure

The pitch of the lenticular lens structure will have an effect on the focusing power, the thickness of the lenticular lens array and substrate and other optical properties such as moiré. In one embodiment of this invention, the lenticular lens array structure is in the form of concentric lenticular lenses. In this embodiment, the lenses are parallel, but are arranged in an arc or circle. The pitch of the lenses and other properties may vary similarly to linear lenticular lenses. A light fixture comprising a light filtering directional control element comprising concentric lenticular lenses can provide a spatial filtering along radial directions as opposed to linear directions. In one embodiment of this invention, a light fixture comprising a substantially centrally located light source and a light filtering directional control element comprising a concentric lenticular lens has a spatial luminance uniformity greater than one selected from 60%, 70%, 80% and 90%. The concentric lenticular lens may be manufactured using injection molding, stamping, embossing or other similar techniques known in the optical industry suitable for making Fresnel lenses. In one embodiment of this invention, a light filtering directional control element, or light fixture comprising the same, comprises a concentric lenticular lens array and at least one of a light reflecting, light absorbing, or light transmitting region wherein the regions are substantially ring or arc-shaped corresponding to the concentric lenticular lens.

In one embodiment of this invention, a light filtering directional control element comprises a linear lenticular lens, light transmitting regions, and a light re-directing element wherein the spacing between the centers of the light transmitting regions is substantially equal to the pitch of the lenticular lenses in the light filtering directional control element and this pitch is predetermined such that the pitch of the optical interference moiré pattern is less than 100 µm and is very difficult or imperceptible to the naked eye from a reasonable viewing distance to a person viewing a light fixture incorporating the element. In one embodiment of this invention, the light filtering directional control element comprises a lenticular array and a collimating element such as a 90 degree apex angle prismatic collimation film. The collimating element may be disposed above or below the lenticular lens array. The visibility of the moiré interference pattern can be visually distracting in a light fixture and reduces the luminance uniformity. The visibility, or luminance contrast of the moiré patterns is defined as LMmax−LMmin/(LMmax+LMmin) where LMmax and LMmin are the maximum and minimum luminance, respectively, along a cross section substantially perpendicular to the repeating moiré pattern when illuminated with diffuse incident light. In one embodiment of this invention, the moiré contrast of the light filtering directional control element, or a fixture comprising the element thereof, low such that the moiré contrast is one selected from the group of 50%, 40%, 30%, 20% and 10%. The moiré contrast may be reduced by shifting the pitch of the moiré pattern such that it is sufficiently small enough not to be visible to the naked eye or be seen without close inspection. This can be accomplished one or more of the following methods: adjusting the pitch of one or more elements, rotating one of the elements relative to the other, randomizing the pitch, or increasing the spacing between the two elements.

Adjusting the Pitch of Lenticular Lens Array to Reduce Moiré Contrast

By adjusting the pitch of one or both the lenticular lens array and the light collimating element, the moiré contrast can be reduced. In order to avoid the moiré, the ratio of the pitches between the two arrays of the elements should be equal to $1/(N+0.5)$ where N is an integer. A pitch ratio from $0.9/(N+0.5)$ to $1.1/(N+0.5)$ will have a relatively low visibility of moiré. The regular array of either element may be P1 or P2 in accordance with the above equation to achieve a minimum level of moiré visibility. In one embodiment of this invention, a light filtering directional control element comprises a lenticular lens array surface of a first pitch P1 and a light collimating element of a second pitch P2 wherein $0.9/(N+0.5) < P2/P1 < 1.1/(N+0.5)$ where N is an integer. In another embodiment of this invention, a light filtering directional control element comprises a lenticular lens array surface of a first pitch P1 and a light collimating element of a second pitch P2 wherein $0.95/(N+0.5) < P2/P1 < 1.05/(N+0.5)$ where N is an integer. In another embodiment of this invention, a light filtering directional control element comprises a lenticular lens array surface of a first pitch P1 and a light collimating element of a second pitch P2 wherein $P2/P1 = 1/(N+0.5)$ where N is an integer. In one embodiment of this invention, a light filtering directional control element comprises a lenticular lens array surface with a 187 micron pitch (P1) and a light collimating element with an approximately 25 micron pitch (P2) wherein $P2/P1 = 0.133 = 1/(N+0.5)=$where N is 7. In one embodiment of this invention, a light filtering directional control element comprises a lenticular lens array surface with a 425 micron pitch (P1) and a light collimating element with a 50 micron pitch (P2) wherein $P2/P1 = 0.1176 = 1/(N+0.5)=$where N is 8. In one embodiment of this invention, a light filtering directional control element comprises a 60 lpi (lines per inch) lenticular lens array film with a 90 degree prism light collimating element with a 50 micron pitch.

In one embodiment of this invention, a light filtering directional control element comprises a lenticular lens array surface with a 237 micron pitch (P1) and a light collimating element with a 356 micron pitch (P2) wherein $P2/P1 = 1.5 = (N+0.5)=$where N is 1. Various combinations of pitches of lenticular lens arrays and light collimating elements can result in a reduced moiré contrast and are within the scope of this invention. Several examples are disclosed in Table 1.

TABLE 1

| | | | P1 | | | |
|---|---|---|---|---|---|---|
| N | 1/(N + 0.5) | N + 0.5 | P2 = 25 µm | P2 = 50 µm | P2 = 356 µm | P2 = 356 µm* |
| 1 | 0.6667 | 1.5 | 38 | 75 | 534 | 237 |
| 2 | 0.4000 | 2.5 | 63 | 125 | 890 | 142 |
| 3 | 0.2857 | 3.5 | 88 | 175 | 1246 | 102 |
| 4 | 0.2222 | 4.5 | 113 | 225 | 1602 | 79 |
| 5 | 0.1818 | 5.5 | 138 | 275 | 1958 | 65 |
| 6 | 0.1538 | 6.5 | 163 | 325 | 2314 | 55 |
| 7 | 0.1333 | 7.5 | 188 | 375 | 2670 | 47 |
| 8 | 0.1176 | 8.5 | 213 | 425 | 3026 | 42 |
| 9 | 0.1053 | 9.5 | 238 | 475 | 3382 | 37 |
| 10 | 0.0952 | 10.5 | 263 | 525 | 3738 | 34 |

As described in Table 1, several different light collimating element pitches (P2) can be used with a range of lenticular lens array pitches (P1) to produce a light filtering collimating lens with reduced moiré contrast. In reference to the far right column, P2=356 µm*, the pitches displayed are determined by P1=P2/(N+0.5) while in the other columns, P1 is determined by the relationship P1=P2*(N+0.5).

Adjusting the Angle Between the Orientation of the Arrays within The Elements to Reduce Moiré Contrast By rotating one of the lenticular lens element or light collimating element relative to the other such that the angle between the arrays is greater than 0 degrees, the moiré contrast can be reduced. In one embodiment of this invention, a light filtering directional control element comprises a lenticular lens array and a light collimating element disposed in two planes substantially parallel to each other such that the angles between the two arrays, φ1 is greater than one selected from group of 0 degrees, 5 degrees, 10 degrees, 20 degrees, 45 degrees and 60 degrees and 80 degrees.

Using a Random or Semi-Random Pitch of the Lenticular Lens Array To Reduce Moiré Contrast A lenticular lens array with a constant pitch can interfere with a constant pitch array of another refractive or TIR based element such as a 90 degree prismatic collimation film. In one embodiment of this invention, the moiré pattern viewable on a light filtering directional control element between a the lenticular lens array and a collimating element or similar array of light refracting elements is alleviated by effectively randomizing the pitch or spacing between the apex or valleys of at least one of the elements. Similarly, the moiré contrast can be reduced producing a random or predetermined variation on the pitch or slop angle of a refracting or TIR element as described in reference to brightness enhancing films in U.S. Pat. Nos. 5,919,551, 6,354,709, 5,771,328, 7,092,163, and 6,862,141.

Increasing the Separation Between the Lenticular Lens Array and Another Optical Lens Array to Reduce Moiré Contrast By increasing the distance between the lenticular lens array and the refractive or TIR based element, the contrast of the moiré pattern is reduce. In one embodiment of this invention, the moiré contrast of the light filtering directional control element or the moiré contrast between a separate optical component and the light filtering directional control element is reduced to less than 50% by separating the interfering elements by at least the lower of the two interfering pitches. In another embodiment of this invention, the moiré contrast of the light filtering directional control element or the moiré contrast between a separate optical component and the light filtering directional control element is reduced to less than 50% by separating the interfering elements by at least twice the lower of the two interfering pitches. The optical elements may be separated by an air gap or by a substantially transparent, clear material, or they may be separated by a diffusing material such as a volumetric anisotropic light scattering element either within the light filtering directional control element or in-between the light filtering directional control element and a separate optical component with a regular array of surface relief structures. The spacing element may also provide an additional function such as a carrier layer, substrate, protective layer, or providing additional diffusion or refractive or TIR based light re-direction.

In one embodiment of this invention, the pitch of the lenticular lens array in combination with the transmissive regions spatially filters the intensity of the incident light and removes the appearance of non-uniformities due to other optical films or the spatial separation of extraction features on a waveguide. In one embodiment of this invention, a light filtering directional control element comprises a lenticular array of pitch P1, at least one of a light reflecting and light absorbing region and a light transmitting region of width A1 measured along an axis perpendicular to the lenticules, optically coupled to a waveguide with light extraction features with a maximum linear dimension $D_{max}$ measured in the plane of the waveguide with a maximum separation distance of $S_d$ such that at least one of P1<$S_d$, P1<$D_{max}$, A1<$D_{max}$ and A1<$S_d$. In a further embodiment of this invention, a light fixture comprising the light filtering directional control element in the previous embodiment has at least one of a spatial luminance uniformity=100%×[1−(Lmax−Lmin)/Lmax+Lmin)] of greater than 70% and a color uniformity of Δu'v'<0.1 between any two points as measured by a horizontal and vertical cross sectional color and luminance measurement passing through the central of the light emitting surface of the light fixture using an imaging photometer wherein the measurement pixel size, PS, in the smaller dimension, is less than 0.5 mm. A photometric imaging pixel size of less than 0.5 mm will resolve the smallest blemish or non-uniformity that is likely to be visible in most all light fixture applications.

In one embodiment of this invention, a light emitting device comprises a light filtering directional control element of pitch P1 and a prismatic light collimating film of pitch P2 wherein P1 is not equal to P2. In another embodiment of this invention, P1>P2 such that the luminance contrast (CL) of the moiré pattern is less than one selected from the group consisting of 0.8, 0.5, 0.2, 0.1 and 0.05 where the luminance contrast of the moiré pattern is defined as CL=(Lmax−Lmin)/(Lmax+Lmin) and Lmax is the maximum luminance between two successive dark moiré patterns and Lmin is the minimum luminance of the dark pattern measured along a line perpendicular to the pattern.

In one embodiment of this invention, a light fixture comprises a light filtering collimating lens with a pitch of P1 and a light guide with light extraction features with a pitch ranging from Pmin to Pmax where Pmin is the minimum spacing between two light extraction features and Pmax is the maximum spacing between two adjacent light extraction features. When the pitch of the light filtering collimating lens is very close to the pitch between two light extraction features, a moiré pattern can be visible. In one embodiment of this invention, a light fixture comprises a light filtering collimating lens with a pitch P1 and a light guide with light extraction features with a maximum spacing of Pmax and P1>Pmax. In another embodiment of this invention, a light fixture comprises a light filtering collimating lens with a pitch P1 and a light guide with light extraction features with a minimum spacing of Pmin and P1<Pmin.

Lenticular Lens Alignment

In an additional embodiment of this invention, the alignment of the lenticular lens array is rotated with respect to an exit aperture of the light emitting device. In one embodiment, the lenticular lens is aligned at an angle φ1 to the longer dimension of the light exiting aperture of the light emitting device. In an additional embodiment, φ1 is one selected from the group consisting of 0 degrees, 45 degrees, and 90 degrees. In another embodiment of this invention, a light fixture comprises a light filtering directional control element wherein the lenticular lens array is aligned at an angle φ2 relative to a 90 degree apex angle prismatic collimating film wherein 90 degrees>φ2>0 degrees and the contrast of the spatial luminance moiré pattern of the light fixture is less than one selected from the group consisting of 0.8, 0.5, 0.2, 0.1 and 0.05.

Light Transmitting Layer

In one embodiment of this invention, an optical element comprises a light transmitting layer disposed between lenticular elements and a first input surface. The light transmitting region may comprise light blocking regions and light transmitting regions. The light blocking regions may be light absorbing, light reflecting, partially light absorbing, partially light reflecting or a combination thereof. The light transmitting layer may comprise a light blocking region comprising a light absorbing region disposed between a light reflecting region and the lenticular elements. The light reflecting regions may be diffusely reflective or specularly reflective and the light transmitting regions may be specularly transmitting or diffusely transmitting. A light absorbing region or light blocking region, as used herein, may include a region that absorbs a first portion of light and transmits or reflects a second portion of light. A light reflecting or light blocking region, as used herein, may include a region that reflects a first portion of light and transmits or absorbs a second portion of light.

Light Transmitting Regions

The light transmitting regions permit light from a specific spatial region to be transmitted through to the lenticular lens array. In order to provide a light filtering directional control element with high light throughput efficiency, a sufficient amount of light must be able to be transmitted through the light transmissive regions. In one embodiment of this invention, the total luminous transmittance of the clear light transmitting regions measured according to ASTM D1003 before the application of the light blocking regions is at least one of 50%, 70%, 80%, 85%, 90%, 95% when measured with the incident light passing through the lenticular lens before the transmissive aperture region. In one embodiment of this invention, the aperture region is diffusely transmissive such that the light is diffused as it passes through the aperture region. Haze is one method for measuring the amount of diffusion in a sample. In one embodiment of this invention, the haze of the of the clear aperture regions measured according to ASTM D1003 with a BYK Gardner Hazemeter before the application of the light blocking regions is at least one of 5%, 10%, 20%, 50%, 80%, 90%, or 99% when measured with the incident light passing through the lenticular lens before the transmissive aperture region. In another embodiment of this invention, the aperture region comprises an anisotropic light scattering region. The anisotropic light scattering region transmits and scatters light anisotropically to provide improved uniformity and a predetermined angular light distribution performance. In a further embodiment of this invention, the asymmetry ratio of the FWHM diffusion profiles of the anisotropic light scattering region is greater than one selected from the group consisting of 2, 5, 10, 30, 50, and 60.

The width of the light transmitting region is selected to provide a predetermined light output angular profile while maintaining a sufficient level light filtering and light transmission through the light filtering collimating lens. The fill factor is defined as the ratio of the light transmitting region width to the width of the light absorbing or reflecting region between the apertures along a first axis parallel to the array of lenticules. In order for the light filtering collimating lens to provide a high degree of collimation, the Collimation Factor, CF, should be sufficiently high assuming a constant focal point, lens shape and refractive index. The Collimation Factor is a relational metric used to compare the ability of a lenticular lens array to collimate light from a specific light transmitting region assuming a constant lenticule curvature and focal distance. The Collimation Factor is defined as the ratio of the pitch of the lenticular lens P1, to the aperture width, A1, or P1/A1. In one embodiment of this invention, the pitch of the lenticular lens is approximately 187 μm, the aperture width of the light transmitting region is 25 μm and the linewidth of the light absorbing (or reflecting) region is 162 μm and the CF is 6.5. In one embodiment of this invention, the CF is greater than one element selected from the group consisting of 1.5, 3, 5, 6, 8 and 10.

The location of the aperture in relation to the lenticular lens elements or arrays determines the directionality of the output light. In one embodiment of this invention, the aperture is centered along the optical axis of the lenticules in an optical element. In another embodiment of this invention, the light output distribution is off-axis and is defined by an angle, γ1, defined from the apex of the lenticule to the center of the apertures and measured from the normal of the substantially planar optical element. In one embodiment of this invention, the angle γ1 is greater than one angle selected from the group comprising 5°, 10°, 15°, 20° 30° and 40°. In one embodiment of this invention, a light fixture comprises a light filtering directional control element wherein γ1 is greater than 5 degrees and the angle of peak intensity of light output from the light fixture is at an angle θ measured from a normal to the exiting surface of the fixture where θ is greater than 0 degrees. In another embodiment of this invention, θ is greater than 5 degrees and the light fixture is a wall-washing type fixture wherein less light is directed into the room directly and more light is directed onto the wall than is the case when θ=0 degrees. In one embodiment of this invention, the optical element (or light fixture comprising the same) has a positive far-field focus greater than a first linear dimension of the light output surface. In one embodiment of this invention, the optical element (or light fixture comprising the same) has a positive far-field focus less than a first linear dimension of the light output surface. As used herein, far-field refers to the distance from the light output surface that is greater than at least 10 times the separation of the smallest separation between the lenticular elements. In a further embodiment of this invention, the aperture is located substantially near the midpoint between the lenticules. In this embodiment, upon wide angle input illumination, the light filtering directional control element produces a twin-lobe output with two maximums intensities. In a further embodiment of this invention, the angular intensity profile resembles that of a batwing light distribution such as commonly desired for in a light fixture to provide a uniform illuminance distribution.

In one embodiment of this invention, the angular light output profile of the light filtering directional control element is controlled by spatially varying at least one of the size, shape, pitch, and transmittance of the light transmitting apertures. By having regions, with wider apertures, for example, the light output from that region will have a lower degree of collimation and higher flux output through less recycling. This technique may be used to spatially adjust the uniformity of light fixture. In one embodiment, an edge-illuminated light fixture comprises a light filtering directional control element wherein the aperture width increases in the region the further the distance from light source lightguide entrance edge. In this embodiment, the method used to create the linewidths of at least one of the light blocking, light reflecting, light absorbing, or light transmitting regions can be used to improve the spatial luminance uniformity of the light fixture. Additionally, the angular output in different regions may be controlled more easily by increasing the aperture width in some regions and reducing the aperture width along at least one axis in order to provide a light fixture with a precisely tailored output profile. In one embodiment of this invention, the angular output in different spatial regions is varied by adjusting the locations of the apertures or light transmitting regions in a first direction in a first plane relative to the optical axes of the corresponding lenticular elements where the first plane is perpendicular to the optical axes.

In one embodiment, the angular output from a light fixture or optical element is modified in one or more regions by converting it to a spatial adjustment in the printing, transfer, exposure, etc. method used to create the size or location of lines, patterns circular holes, etc. and thus apertures. In another embodiment of this invention, at least one of the linewidth and location relative to the optical axis of its respective lenticule of the light transmitting region varies along a direction parallel to the lenticular array to provide a focusing or concentrating affect to the light output profile. As discussed herein, by shifting the light transmitting region to one side of the axis of a lenticule, light can be directed off-axis. By shifting the light transmitting regions spatially in two opposite regions in away from each other in different areas of a light fixture, the light exiting the lenticules from those corresponding regions can be directed toward a specific location off-axis at an angle theta, thus essentially creating a positive focal point for the light output. In the case where the light transmitting regions move closer towards each other, the light output from the corresponding lenticular lens array regions diverges relative to each other, thus creating a type of negative (or virtual focus).

In one embodiment of this invention a light filtering directional control element comprises an input surface, an output surface, first light transmitting regions, first light blocking regions, a first group of lenticular elements formed in a first light transmitting material with first lenticular apexes and first optical axes, a light transmitting layer disposed in an optical path between the input surface and the first group of lenticular elements comprising the first light blocking regions disposed in-between the first light transmitting regions, a first angle gamma, defined as the angle between the line formed between the apexes of the first group of lenticular elements and the center of the light transmitting regions and the optical axes of the first group of lenticular elements wherein the first group of light blocking regions are disposed to intersect the optical axes of the first group of lenticular elements and gamma is greater than 5 degrees, a second group of lenticular elements formed in the first transmitting material with second lenticular apexes and second optical axes, and further comprises: a second light blocking regions disposed in the first light transmitting layer, second light transmitting regions disposed in the first light transmitting layer and in-between the second light blocking regions, a second angle delta, defined as the angle between the line formed between the apexes of the second group of lenticular elements and the center of the second light transmitting regions and the second optical axes of the second group of lenticular elements, wherein gamma is not equal to delta. In one embodiment of this invention, the optical element comprises a lenticular element with different groups of light transmitting regions that vary in their location with respect to the corresponding optical axes of the lenticular elements. By varying the relative locations of the light transmitting apertures, the far-field angular light output can be controlled to provide a far-field focal point and off-axis directionality.

In one embodiment of this invention, a substantially planar light fixture comprises a light filtering direction control element with a positive focal distance. In one embodiment of this invention, a substantially planar light fixture comprises a light filtering direction control element with a negative focal distance. A positive or negative focal distance can be used in a light fixture to provide increased control over the light output and can be used to concentrate or further spread out light within one or more output planes.

In one embodiment of this invention, the angular light output profile of the light filtering directional control element is controlled by spatially varying at least one of the size, shape, pitch, and transmittance of the lenticular elements and/or the light transmitting regions.

Light Reflective Region

In one embodiment of this invention, light reflecting regions are disposed substantially in-between the light transmitting aperture regions in a light filtering directional control element. The reflective regions may be diffusely reflective or specularly reflective and the diffusely reflective profile may be symmetric or anisotropic. Typically in light fixtures, the light reaching the optical elements arrives from a wide range of angles and therefore, the diffuse luminance reflectance measured in a d/8 geometry (shortened here to diffuse reflectance) is a more representative measurement of the reflectance from the component in a light fixture application than 1 minus the specular transmittance such as defined and sometimes measured according to the ASTM D1003 standard. The diffuse reflectance of an element, region, or combination of regions can be measured placing the element or region(s) over an aperture of a "dark box" wherein the interior is filled with light absorbing material such as a black felt and measuring the diffuse reflectance (specular component included) of the element using a Minolta CM-508d diffuse reflectance meter.

A diffusely reflecting region as defined herein is one wherein laser light with a divergence less than 10 milliradians incident upon the region reflects with a larger angular diffusion profile such that the FWHM of the diffuse reflecting profile is greater than 2 degrees within at least one plane of reflection. In one embodiment of this invention, the diffusely reflecting region anisotropically reflects light such that the angular FWHM of the diffuse reflectance is higher in a first reflectance plane than a second reflectance plane orthogonal to the first. In one embodiment of this invention, a light filtering directional control element comprises light reflecting regions of an anisotropically reflecting diffuser with a FWHM diffusion profile of at least 5 degrees within a first reflecting plane and an asymmetry ratio of greater than 1. In this embodiment, the light transmitting apertures are disposed between the anisotropic light scattering regions. In another embodiment of this invention, a light filtering collimating lens comprises light reflecting regions of an anisotropically reflecting diffuser with a FWHM diffusion profile of at least 5 degrees within a first reflecting plane and an asymmetry ratio of greater than 1 wherein the reflecting diffusion plane with the larger FWHM angular diffusion profile is oriented perpendicular to the lenticules in the lenticular lens array. In this embodiment, the light reflected from the anisotropically reflecting regions is more efficiently directed angularly toward the clear apertures wherein more light may pass through the light transmitting apertures than in the case of a symmetrically diffusing light reflecting region wherein light is additionally diffused in a direction parallel to the lenticules and parallel to the diffusely reflecting region. The light scattering parallel to the reflecting regions will require significantly more reflections in order to exit through the light transmitting apertures. These multiple reflections cause more of the light to be absorbed within the materials.

In one embodiment of this invention, a light filtering directional control element comprises a substantially diffusely reflecting region. In a further embodiment of this invention, a light fixture comprises a light filtering directional control element with substantially transparent regions disposed between light reflecting regions wherein the diffuse reflectance of the light filtering directional control element is greater than one selected from the group consisting of 40%, 50%, 60%, 70%, 80%, 90%, and 95% when measured with diffusely incident light on the side of the lenticular lens array comprising the light reflecting region.

The light transmitting regions can reflect a portion of the incident light in a specular, symmetrically diffuse, or anisotropic scattering reflecting profile. In light filtering directional control elements comprising light reflecting regions and light transmitting regions which are partially transmitting and partially reflecting, the reflectance from the combination will increase the luminance and color uniformity when used in a light fixture. In one embodiment of this invention, a light fixture comprises a light filtering directional control element with partially transparent regions disposed between diffusely reflecting regions wherein the diffuse reflectance of the combination of the light reflecting region and the light transmitting region is greater than one selected from the group consisting of 40%, 50%, 60%, 70%, 80%, 90%, and 95%. In one embodiment of this invention, a light fixture comprises a light filtering directional control element with light transmitting regions disposed between light reflecting regions wherein the light transmitting regions have a diffuse reflectance greater than 10% and the diffuse reflectance of the combination of the light reflecting region and the light transmitting apertures is greater than 80%. In this embodiment, more light is recycled than in to the case of substantially transparent or low reflectance light transmitting regions and therefore the luminance and color uniformity of a light fixture incorporating the element is improved while still providing a sufficient amount of light to pass through the apertures and exit the light fixture. In a further embodiment of this invention, a light fixture comprises a light filtering directional control element with a lenticular lens array and light reflecting regions disposed in-between light transmitting regions wherein the light transmitting regions contain asymmetric particles and the reflected light from the light transmitting region is reflected anisotropically and the diffuse reflectance of the light transmitting region is greater than 10% and less than 80%.

In another embodiment of this invention, a light fixture comprises a light filtering directional control element comprising a lenticular lens array and light transmitting regions disposed between light reflecting regions wherein the diffuse reflectance of the light reflecting region and the light transmitting region is greater than one selected from the group consisting of 40%, 50%, 60%, 70%, 80%, 90%, and 95%.

In light filtering directional control elements which have light transmitting regions made of substantially transparent material where the light transmittance is greater than approximately 92% (including Fresnel reflections), the diffuse reflectance of the light reflecting regions disposed between the light transmitting regions can be calculated. The diffuse reflectance of the light reflecting region $DR_{LR}$ can be calculated by dividing the diffuse reflectance of the total of both regions ($DR_T$) by the area ratio of the light reflecting region, $1-AR_T$ where $AR_T$ is the percentage of area of the total region occupied by the light transmitting region and thus the diffuse reflectance of the light reflecting region, $DR_{LR}=DR_T/(1-AR_T)$. In another embodiment of this invention, a light fixture comprises a light filtering directional control element which comprises a lenticular lens array and light transmitting regions disposed between light reflecting regions wherein the diffuse reflectance of the light reflecting regions is greater than one selected from the group consisting of 80%, 90%, and 95% as measured by the aforementioned method.

In one embodiment of this invention, the diffuse reflectance of the diffusely reflecting regions is less than 95% such that more than 5% of the light is transmitted through the diffusely reflecting regions. By increasing the light transmittance (lowering the diffuse reflectance), light is transmitted at the higher angles from the normal in addition to the light passing through the clear apertures which is more collimated. The light transmitting through the diffuse regions will lower the moiré contrast between the light filtering directional control element and another optical element in the system. In one embodiment of this invention, the light output profile of a light fixture comprising a light filtering directional control element has a softer angular cut-off due to the diffusely reflecting regions having a light transmittance greater than 5%. In a further embodiment of this invention, the light output profile of a light fixture comprising a light filtering directional control element comprising reflecting regions having a light transmittance greater than 5% has an angular output region with a slope of less than one selected from the group of 10% per degree, 5% per degree, 2% per degree, and 1% per degree where the % drop refers to the percentage of the intensity relative to the peak intensity in the angular region between the peak intensity and the angular points at 10% intensity within at least one output plane.

The light reflective region may comprise a reflective ink, beads or other additives that substantially reflect light of one or more wavelength ranges. The reflective additive used in an ink or polymer system may include $BaSO_4$, $TiO_2$, organic clays, fluoropolymers, glass beads, silicone beads, cross-linked acrylic or polystyrene beads, alumina, or other materials known in the diffusion screen or film industry for backlights or projection screens such that the refractive index difference between them and a supporting polymer matrix or binder is sufficiently high to reflect light. The light reflecting region may also be a light reflecting material such as PTFE, or it may comprise a blend of thermoplastic polymers such as described in U.S. patent application Ser. No. 11/426,198, or U.S. Pat. Nos. 5,932,342, 5,825,543, and 5,268,225, the text of each is incorporated by reference herein where the refractive index between the two polymers is chosen to be very high such that the light reflects from the film. In another embodiment of this invention, the light reflecting region is a voided film such those described in U.S. Pat. Nos. 7,273,640, 5,843, 578, 5,275,854, 5,672,409, 6,228,313, 6,004,664, 5,141,685, and 6,130,278, and U.S. patent application Ser. No. 10/020, 404, the contents of each are incorporated by reference herein.

The light reflecting region may comprise nanoparticle dispersions such as nanodispersions of aluminum or silver or other metals that can create a specularly reflecting ink. In one embodiment of this invention, a light fixture comprises a specular light reflecting region which recycles the incident light from within the fixture to provide uniformity and the light output from the fixture is substantially collimated from the light filtering collimating film. In a further embodiment, the specularly reflecting region allows the light fixture to serve as a mirror when the light fixture is off and the light filtering directional control element serves to recycle and provided increased uniformity in a small form factor (reduced total thickness of the light fixture) as well as reducing the angular output of light such that the output light is more collimated. In a further embodiment of this invention, a light fixture comprises a light filtering directional control element with a specularly reflective region wherein the fill factor of the specularly reflective region is greater than 50% area such that the display can be used as a mirror as well as a light source simultaneously. This allows the elimination of shadows on the viewers face, reduces the form factor by not needing an additional, separate light source near one or more of the edges and also promotes portability. In a further embodiment of this invention, a lighted mirror comprises a light filtering directional control element comprising a lenticular lens array, a specularly reflecting region and light transmitting regions between the linear arrays of the light reflecting regions such that the fill factor of the specularly reflecting regions is greater than 75%. In a further embodiment, the width of the light transmitting apertures is less than 100 microns such that the individual bright lines are not readily discernable.

In one embodiment of this invention, the reflecting region is a multilayer dielectric coating or a multilayer polymeric reflector film such as described in U.S. Pat. Nos. 7,038,745, 6,117,530, 6,829,071, 5,825,543, and 5,867,316, or DBEF film produced by 3M. Multilayer polymeric reflective films can have specular or diffuse reflectances in the visible spectrum greater than 98% and thus can be more efficient in an optical system. The multi-layer polymeric reflector film may be specularly reflective, diffusely reflective, diffusely transmissive, anisotropically forward scattering or anisotropically backward scattering for one or more polarization states. In a light fixture where the light reflecting regions are a multilayer polymeric reflector, the low light loss enables more reflections before the light is absorbed and thus a cavity within the light fixture can be made thinner and/or the light transmitting apertures can be smaller, thus providing higher uniformity and more light filtering in a thinner form factor.

In a further embodiment, the light fixture with a mirror mode further comprises red, green, and blue LED's such that the color of the light output can be adjusted to match a desired illumination color (such as fluorescent office lights, halogen lights, or daylight or a cloudy day). This is useful for a user to discern their appearance (makeup, clothes, etc.) in the expected illuminant color for the day. The intensity may also be adjusted such that the brightness is at a pleasing level. By being able to illuminate the viewer at an angle closer to or at the normal to the mirror, fewer or no shadows are visible in contrast to light disposed along the edges of a mirror. In a further embodiment, the regions corresponding to the viewers eyes has reduced light transmission by at least one of increasing the width of the light reflecting lines and reducing the transmission of the light transmitting apertures. In a further embodiment of this light fixture with a mirror mode, the light output is collimated to an angular width of less than 15 degree FWHM in at least two orthogonal planes such that less of the light output in the regions distant from the viewers eyes will not reach their eyes and result in glare when viewing in the mirror mode.

Light Blocking and Light Transmitting Region

In one embodiment of this invention, the light filtering directional control element comprises light absorbing and light transmitting regions disposed in a light transmitting layer substantially in-between light transmitting apertures or regions. Some methods of manufacturing limit the diffuse reflectance of a light reflecting regions (such as in the case of a mostly reflecting, partially transmitting light reflecting region) to less than 90%. The light transmitted through the reflective regions is less collimated in some configurations and as a result the angular spread of light may be larger than desired. In one embodiment of this invention, a light absorbing region is disposed between the lenticules and the light reflecting region, and substantially over the light reflecting regions. In this embodiment, the light absorbing regions will absorb a substantial amount of residual light transmitted through the light reflecting regions. In another embodiment of this invention, the light reflecting layers reflect a portion of incident light such that the uniformity of the incident light pattern is increased without absorbing a significant amount of light that would prohibit recycling and increase light output.

In a further embodiment of this invention, a light fixture comprising a light filtering directional control element with a light absorbing region disposed between the lenticules and a light reflecting region has a diffuse reflectance measured from the light exiting surface of the light fixture of less than one selected from the group of 80%, 60%, 40% 30%, 20%, 10% and 5%. In a further embodiment of this invention, a light fixture comprising a light filtering collimating lens has a diffuse reflectance of less than 20% and appears substantially black when viewed in a first angular range in the off-state and the on-state. In some applications, it is desirable to minimize ambient light reflections from the light fixture such as in movie theaters, airplane cockpits, etc. By employing a light absorbing region along with a light reflecting region, the recycling due to the light reflecting region and the light transmitting apertures provides the increased efficiency, uniformity and angular control, while the light absorbing regions provide reduced ambient light reflections and lower transmittance above the light reflecting regions which can reduce light levels in the predetermined angular range.

Light fixtures with high efficiencies may often appear non-white such as silver or gray. This can occur because optical elements such as diffusers with high forward light transmission for efficiently directing light from inside the fixture to the appropriate angles and uniformity profiles outside of the fixture do not reflect ambient light. By not reflecting ambient light, the fixtures, when not turned on, often have a gray or silver appearance depending on the remaining optical elements within the fixture. In one embodiment of this invention, a light fixture has a sufficient diffuse luminous reflectance of ambient light while maintaining a high luminous transmittance of light from the light filtering collimating lens. The diffuse reflectance of the light fixture can be measured in a (d/8 geometry) using a Minolta CM-508d with the specular component included and measuring the reflectance from the light exiting surface on the light exiting side. The forward luminous transmittance of the light filtering directional control element used in a light fixture can be measured by according to ASTM D1003 measured with the light incident on the diffuse reflecting side of the light filtering directional control element. In one embodiment of this invention, a light filtering directional control element has a diffuse reflectance measured on the light exiting surface of greater than 30% and a forward luminous transmittance of greater than 50%. In another embodiment of this invention, a light filtering directional control element has a diffuse reflectance measured on the light exiting surface of greater than 20% and a forward luminous transmittance of greater than 40%. In another embodiment of this invention, the optical system efficiency of a light fixture incorporating a light filtering directional control element is greater than 60% as measured comparing the light source flux output and the flux output of a light fixture incorporating the same light source in a sufficiently large integrating sphere.

In another embodiment of this invention, the reflected color of the light fixture output surface sufficiently matches that of the housing. In some environments, it is desirable to match the color of the light fixture housing to the light emitting surface. Normally, this is difficult to achieve without introducing a light absorbing filter into the path which significantly reduces the output luminous flux of the fixture. In one embodiment of this invention, a light fixture comprises a light filtering collimating lens with a light absorbing region disposed between a lenticular lens array and a light reflecting region wherein the light absorbing region has a color difference from a region of the light fixture housing of $\Delta u'v'$ of less than 0.1 on the 1976 u', v' Uniform Chromaticity Scale as described in VESA Flat Panel Display Measurements Standard version 2.0, Jun. 1, 2001 (Appendix 201, page 249) and measured with a Minolta CM-508d spectrometer under d/8 conditions, specular component included. In another embodiment of this invention, a light fixture comprising a light filtering directional control element has a color difference $\Delta u'v'$ of less than 0.04 between at least one region of the light emitting surface and at least one region of the housing. In another embodiment of this invention, a light fixture comprises a light filtering directional control element wherein the difference between the diffuse reflectance of at least one region of the light emitting surface and at least one region of the housing is less than 20%. In a further embodiment of this invention, a light fixture comprises a light filtering directional control element wherein the difference between the diffuse reflectance of at least one region of the light emitting surface and at least one region of the housing is less than 10%. In a further embodiment of this invention, a light fixture comprises a light filtering directional control element wherein the difference between the diffuse reflectance of at least one region of the light emitting surface and at least one region of the housing is less than 20% and the color difference $\Delta u'v'$ is less than 0.2. In one embodiment of this invention, the difference ($\Delta u'v'$) between the integrated light output color of a light emitting device and the average color of the output surface when viewed at an angle greater than 10 degrees from the peak output angle is greater than 0.01 when emitting light. In a further embodiment of this invention, the difference ($\Delta u'v'$) between the integrated light output color of a light emitting device when emitting light and the average color of the output surface when the light emitting device is not emitting light and is illuminated by a standard illuminant A when viewed at a first angle is greater than 0.01. In one embodiment of this invention, the light emitting device is a sign, display, information device, or mirror which emits light of a first color when turned on and the output surface has a second color (or mirrored look or information content) when turned off or viewed from a second angle where the color difference ($\Delta u'v'$) between the first and second colors is greater than 0.01.

In a further embodiment of this invention, the surface of the light emitting fixture comprising a light filtering directional control element has information bearing content such as graphics, text, icons, indicia, etc. In one embodiment, the information is visible outside of the illumination angles. In one embodiment, the light absorbing regions vary in absorption such that at least one of the ambient reflected light or transmitted light exiting the light fixture carries information in the form of text, graphics, icons or other indicia. In one embodiment of this invention, the light fixture also functions as a sign. In one embodiment of this invention, the light fixture is an exit sign wherein the sign can efficiently be read when the light source is off due to diffuse reflectance from the light reflecting region. In one embodiment of this invention, a light fixture comprises a lenticular lens array with a striped, printed, light reflecting region and striped light transmitting clear region such that the light exiting the light transmitting region is refracted into a smaller angular range and the ambient light reflected displays information content through reflection from the light reflecting regions. In a further embodiment of this invention, a light fixture or sign comprises a light absorbing information region between a lenticular lens array and a light reflecting region.

In one embodiment of this invention, a light filtering directional control element comprises a light absorbing region disposed between a lenticular lens array and a light reflecting region such that the separation between the light reflecting region and the light absorbing region is greater than the thickness of the thinner of the two regions. By spatially separating the two regions, the angular output of the light exiting the light filtering directional control element will have a reduced angular width. By separating the light reflecting and light absorbing regions they form a parallax barrier which can be used to limit the angular output without requiring a reduction in aperture width.

In a further embodiment of this invention, the focal point of the lenticules is substantially near at least one of the light absorbing region or the light reflecting region. In a further embodiment, the focal point is substantially in-between the light absorbing region and the light reflecting region. By designing the substrate thickness, curvature and surface profile of the lenticules such that the focal point is located at the midpoint between the light reflecting and light absorbing regions, the light throughput is optimized due to the angular spread from the focal point to the light absorbing region being equal to the angular spread from the focal point to the light reflecting region.

In a further embodiment of this invention, the light reflecting regions and the light absorbing regions are in contact with each other such as white ink printed on a cured black ink or a black toner transferred onto a white toner or a co-extruded polyester film with a black light absorbing layer and a white light reflecting layer.

Area Ratios

In one embodiment of this invention, the light filtering directional control element comprises at least one of light absorbing region with light transmitting regions and a light reflecting region with light transmitting regions. The light transmitting aperture ratio, $AR_T$, is the ratio of the surface area of the light transmitting region to the total area of either the light absorbing region or the light reflecting region plus the area of the light transmitting region. This area ratio affects the total optical efficiency, angular output, the spatial color and luminance uniformity, and the angular color and illuminance uniformity of the light filtering directional control element or a light fixture employing the same. For an element comprising a light reflecting region, the light transmitting aperture ratio, $AR_T$ is defined by the equation:

$$AR_T = \frac{A_T}{A_R + A_T}$$

where $A_T$ is the area of the light transmitting region and $A_R$ is the area of the light reflecting region. Similarly, for an element comprising a light absorbing region, the ratio of the surface areas is $$AR_T = \frac{A_T}{A_A + A_T}$$

where $A_T$ is the area of the light transmitting region and $A_A$ is the area of the light absorbing region.

For linear lenticular lens arrays and linear light transmitting apertures, the ratio of the areas can also be determined by the ratio of the width of the light transmitting aperture to the pitch where the pitch is the width of the light transmitting region plus either the width of the light absorbing region or the light reflecting region.

Light filtering directional control elements having small light transmitting aperture ratios will output more collimated light (light with a smaller angular FWHM cross-section of the intensity) within the plane perpendicular to the output surface and parallel to the array the lenticular lenses (parallel to the plane comprising the refraction due to the refractive lenses).

Also, light filtering directional control elements with small light transmitting aperture ratios will filter out more spatial light intensity irregularities (non-uniformities such as blemishes) and when the element comprises a light reflecting region, the recycling will improve the spatial color and luminance uniformity and enable more thinner optical designs of light fixtures.

In edge-lit light fixtures, the light extracted near the incident edge is often much brighter than that at the far edge. In edge-lit LED light fixtures, the same can be true and the regions of the waveguide corresponding to the regions between the LED's may less bright than the regions closer to the LED's. The type, size, shape, and spatial arrangement of the light extraction features in edge-lit designs is typically adjusted to result in more uniform output from the fixture. Recycling films such as 90 degree prism films, diffusers, light scattering films, and white reflective films aid the uniformity through recycling and scattering, however, for a given size light entrance edge, the fewer the LED's, the more difficult it is to create a spatially uniform light extraction profile.

A term that can be used to measure the distance required to mix and extract the light from the waveguide is the Luminance Mixing Distance (LMD). For light fixtures, it is desirable to have a luminance uniformity of at least 70%, or more preferably 80%. The uniformity (100%*[1−(Lmax−Lmin)/(Lmax+Lmin)]) is measured in the direction parallel to the entrance edge (typically parallel to the LED array) or in the direction perpendicular to the entrance edge. The $LMD_\|$ is the distance measured from the entrance edge of the waveguide to the point where the linear spatial luminance cross-section on the output surface of the light fixture along direction parallel to the entrance edge has a luminance uniformity of at least 80%. Secondary optics on the LED's or optical components such as reflectors, lenticular lens arrays and anisotropic diffusers may be used on the entrance edge to reduce the $LMD_\|$. The length in the plane parallel to the entrance edge of the incident light profile which is incident on the edge of a substantially planar waveguide is termed Entrance Source Length (ESL). The Entrance Source Length is defined as the maximum spatial length on the entrance edge surface along a direction parallel to the edge of the waveguide enclosed by the angular FWHM of the intensity profile of the light incident on the edge. For light fixtures with a constant LED pitch and constant intensity profile incident on the edge, the ESL can be measured from the LED pitch, the angular intensity profile from the LED (or LED plus secondary optics) and the distance to from the LED (or LED plus secondary optics) to the edge of the waveguide. A larger ESL will have a higher luminance uniformity near the edge of the waveguide and thus the $LMD_\|$ is reduced. In the case of a multiple-LED edge-lit light fixture, the larger the spacing or pitch ($P_L$) between the LED's along one edge of a light fixture, the larger the $LMD_\|$ will be for a fixed optical system (same waveguide and optical components). As a result, one metric for describing the incident light profile on the edge of a waveguide in relationship to its affect on the uniformity is the Input Light Ratio, ILR, defined as $$ILR = \frac{ESL}{P_L}.$$

Light fixtures with a small Input Light Ratio will require more light recycling to achieve a fixed $LMD_\|$ than a those with a high ILR. In cases where the LED's are spaced from the edge and the input profiles overlap, the ILR ratio can be greater than 1. In the special case where a single LED is used, the ILR is the ESL divided by the length of the dimension of the output surface substantially parallel to the entrance edge. In one embodiment of this invention, a light filtering directional control element comprises a lenticular lens array, a light reflecting region, and a light transmitting region wherein the ILR is less than one selected from the group of 1, 0.7, 0.5, 0.3, 0.2 and 0.1. A metric for evaluating the effectiveness of a light fixture to mix the light is the Source Adjusted Luminance Mixing Distance ($LMD_{\|SA}$) which adjusts the $LMD_\|$ by the Input Light Ratio and is defined as $LMD_{\|SA} = LMD_\| \times ILR.$ A light fixture with a high level of "fast mixing" (mixing the light well over a short distance from the edge) has a very low $LMD_{\|SA}$ and has a higher performance value. These high performance "fast mixing" light fixtures have a small $LMD_\|$ and a small ILR value and thus a very small $LMD_{\|SA}$. A light fixture that has a large $LMD_\|$ and a small ILR or a small $LMD_\|$ and a large ILR has an average performance and medium $LMD_{\|SA}$ value. Light fixtures with a large $LMD_\|$ and a large ILR high have a very large $LMD_{\|SA}$ and poor mixing performance. In one embodiment of this invention, a light filtering directional control element comprises a lenticular lens array, a light reflecting region, and a light transmitting region wherein the $LMD_{\|SA}$ is less than one selected from the group of 5 mm, 3 mm, 2 mm, and 1 mm.

The luminance light fixture in the direction perpendicular to the input edge will typically be very high near the edge and fall-off the further the distance from the edge. The luminance mixing distance of a light fixture in the direction perpendicular to the input edge, $LMD\perp$, is the distance measured along a line on the light emitting surface perpendicular to the entrance edge (passing through the midpoint of the light emitting surface in the direction parallel to the edge) from the entrance edge of the waveguide to the closest point at which the luminance at any further point along the line is within 80% of the average of the remaining points along the line. In one example, if the LED array is on the left side of a light fixture, then the LMD⊥ is the distance from the edge of the waveguide to the first point along the middle of the light fixture where all other points to the right are within 80% of the average of the remaining points to the right. Secondary optics on the LED's or optical components such as reflectors, lenticular lens arrays and anisotropic diffusers may be used on the entrance edge to reduce the LMD⊥. The length in the plane parallel to the entrance edge of the incident light profile which is incident on the edge of a substantially planar waveguide is termed Entrance Source Length (ESL). The Entrance Source Length is defined as the maximum spatial length on the entrance edge along a direction parallel to the edge of the waveguide enclosed by the angular FWHM of the intensity profile of the light incident on the edge. For light fixtures with a constant LED pitch and constant intensity profile incident on the edge, this can be measured from the LED pitch, the angular intensity profile from the LED (or LED plus secondary optics) and the distance from the LED (or LED plus secondary optics) to the edge of the waveguide. The location, size, spacing, shape, type, etc. of the light extraction features will have a significant affect on the LMD⊥.

A light fixture with a high level of "fast mixing" along a direction perpendicular to the LED array (mixing the light uniformly across the light fixture) has a very high LMD⊥. In one embodiment of this invention, a light filtering directional control element comprises a lenticular lens array, a light reflecting region, and a light transmitting region wherein the LMD⊥ is less than one selected from the group of 5 mm, 3 mm, 2 mm, and 1 mm.

As disclosed above in relation to luminance uniformity, one can also measure the performance in terms of color uniformity. For color uniformity, the $\Delta u'v'$ value is measured between all points in the direction parallel to the entrance edge (typically parallel to the LED array) or in the direction perpendicular to the entrance edge. The Color Mixing Distance, $CMD_\parallel$ is the distance measured from the entrance edge of the waveguide to the point where the color uniformity $\Delta u'v'$ is less than 0.04 along a cross-section on the output surface of the light fixture along direction parallel to the entrance edge. Similarly, the Color Mixing Distance (Source Adjusted) is defined as $$CMD_{\parallel SA} = CMD_\parallel \times ILR.$$

In one embodiment of this invention, a light filtering directional control element comprises a lenticular lens array, a light reflecting region, and a light transmitting region wherein the $CMD_{\parallel SA}$ is less than one selected from the group of 5 mm, 3 mm, 2 mm, and 1 mm.

In the direction perpendicular to the entrance edge, the Color Mixing Distance, $CMD\perp$, is the distance measured along a line on the light emitting surface perpendicular to the entrance edge (passing through the midpoint of the light emitting surface in the direction parallel to the edge) from the entrance edge of the waveguide to the closest point at which the color uniformity $\Delta u'v'$ at any point further point along the line is less than 0.1 from the remaining points along the line.

In one embodiment of this invention, a light filtering directional control element comprises a lenticular lens array, a light reflecting region, and a light transmitting region wherein the $CMD\perp$ is less than one selected from the group of 5 mm, 3 mm, 2 mm, and 1 mm.

Protective Layer

In one embodiment of this invention, a light filtering directional control element further comprises a protective layer to protect at least one of the light reflecting or light absorbing region from being scratched during assembly or function use in devices such as light fixtures. The protective layer may be a laminated PET layer adhered using a pressure sensitive adhesive, a protective hardcoating such as those used in the projection screen and polarizer industry or other protective layers or coatings known to increase scratch resistance. In one embodiment of this invention, the protective layer also provides the spacing between the lenticular lens array and a light collimating element.

Anisotropic Light-Scattering Regions

The light filtering directional control element may include more than one anisotropic light-scattering region or layers. In one embodiment of this invention, a light fixture comprises a light filtering collimating film with a first input surface disposed to receive light and an first output surface disposed to output light wherein the light filtering directional control element collimates the light within a first plane and the light fixture further comprises an anisotropic light scattering element disposed in the optical path after the first light output surface and has a higher angular FWHM diffusion profile in the first plane than in a second plane orthogonal to the first. In this embodiment, the light filtering collimating lens filters out the unwanted non-uniformities of the incident light in a very thin profile and substantially collimates the incident light (such as providing an output light with an angular FWHM of less than 10 degrees FWHM in the first output plane). The anisotropic diffuser can be provided with a range of angles to provide a customizable light output profile. In one embodiment of this invention, a light fixture with an angular FWHM of less than 10 degrees in at least one output plane and an anisotropic light scattering film is provided as a kit wherein the combination of the two provides a pre-determined light output profile.

One or more of the diffusing (scattering) regions may have an asymmetric diffusion profile in the forward (transmission) or backward (reflection) directions. The light filtering directional control element may contain volumetric and surface-relief-based scattering regions that may be asymmetric or symmetric. The scattering regions or layers may be optically coupled or separated by another material or an air gap. In one embodiment of this invention, a rigid, substantially transparent material separates two diffusing regions. In another embodiment of this invention, the asymmetrically diffusive regions are aligned such that the luminance uniformity of a light fixture is improved. In another embodiment, the spatial luminance profile of a light fixture using a linear or grid array of light sources is made substantially uniform through the use of one or more asymmetrically diffusing regions.

The use of a volumetric anisotropic light scattering region in the light fixture comprising a light filtering directional control element allows the scattering region to be optically coupled to the light guide such that it will still support waveguide conditions. An anisotropic surface relief scattering region on the surface of the light guide or a surface of a component optically coupled to the light guide will substantially scatter light in that region out of the light guide, thus not permitting spatially uniform out-coupling in the case of scattering over a significant portion of the light guide surface. Additionally, anisotropic scattering surface relief structures are difficult to manufacture in large sizes due to complex holographic recording techniques required.

In one embodiment of this invention, the light filtering directional control element comprises an anisotropic light scattering region wherein asymmetrically shaped dispersed phase domains of one polymer within another matrix polymer contribute to the anisotropic light scattering. The anisotropic scattering region may be non-polarization dependent anisotropic light scattering (NPDALS) or polarization dependent anisotropic light scattering (PDALS). Light fixtures with polarized light output can reduce the glare off of surfaces and discussed in U.S. Pat. No. 6,297,906, the contents of which are incorporated herein by reference.

The amount of diffusion in the x-z and y-z planes for the NPDALS or PDALS regions affects the luminance uniformity and the angular light output profiles of the light fixture. By increasing the amount of diffusion in one plane preferentially over that in the other plane, the angular light output from the light fixture is asymmetrically increased. For example, with more diffusion in the x-z plane than the y-z plane, the angular light output (measured in the FWHM of the intensity profile) is increased in the x-z plane. The diffusion asymmetry introduced through one or more of the anisotropic light-scattering regions of the light filtering directional control element can allow for greater control over the viewing angle, color shift, color uniformity, luminance uniformity, and angular intensity profile of the light fixture and the optical efficiency of the light fixture. In another embodiment, the amount of diffusion (measured as FWHM of the angular intensity profile) varies in the plane of the diffusing layer. In another embodiment, the amount of diffusion varies in the plane perpendicular to the plane of the layer (z direction). In another embodiment of this invention, the amount of diffusion is higher in the regions in close proximity of one or more of the light sources.

The birefringence of one or more of the substrates, elements or dispersed phase domains may be greater than 0.1 such that a significant amount of polarization selectivity occurs due to the difference in the critical angle for different polarization states when this optically anisotropic material is optically coupled to or forms part of the light guide. An example of this polarization selectivity is found in U.S. Pat. No. 6,795,244, the contents are incorporated herein by reference.

Alignment of Major Diffusing Axis in Anisotropic Light Scattering Region

The alignment of the major axis of diffusion in one or more of the anisotropic light-scattering regions may be aligned parallel, perpendicular or at an angle $\theta_3$ with respect to a light source or edge of the waveguide. In one embodiment, the axis of stronger diffusion is aligned perpendicular to the length of a linear light source in a cold-cathode fluorescent edge-lit light fixture. In another embodiment of this invention, the axis of stronger diffusion is aligned perpendicular to the length of a linear array of LED illuminating the edge of waveguide in an edge-lit LED based light fixture.

Domain Shape

The domains within one or more light scattering regions may be fibrous, spheroidal, cylindrical, spherical, other non-symmetric shape, or a combination of one or more of these shapes. The shape of the domains may be engineered such that substantially more diffusion occurs in the x-z plane than that in the y-z plane. The shape of the domains or domains may vary spatially along one or more of the x, y, or z directions. The variation may be regular, semi-random, or random.

Domain Alignment

The domains within a diffusing layer may be aligned at an angle normal, parallel, or an angle theta with respect to an edge of the diffusing layer or a linear light source or array of light sources. In one embodiment, the domains in a diffusing region are substantially aligned along one axis that is parallel to a linear array of light sources.

Domain Location

The domains may be contained within the volume of a continuous-phase material or they may be protruding (or directly beneath a partially conformable protrusion) from the surface of the continuous-phase material.

Domain Concentration

The domains described herein in one or more light-diffusing regions may be in a low or high concentration. When the diffusion layer is thick, a lower concentration of domains is needed for an equivalent amount of diffusion. When the light-diffusing layer is thin, a higher concentration of domains or a greater difference in refractive index is needed for a high amount of scattering. The concentration of the dispersed domains may be from less than 1% by weight to 50% by weight. In certain conditions, a concentration of domains higher than 50% by volume may be achieved by careful selection of materials and manufacturing techniques. A higher concentration permits a thinner diffusive layer and as a result, a thinner light fixture or light filtering directional control element. The concentration may also vary spatially along one or more of the x, y, or z directions. The variation may be regular, semi-random, or random.

Index of Refraction

The difference in refractive index between the domains and the matrix in one or more of the NPDALS, PDALS or other light scattering regions may be very small or large in one or more of the x, y, or z directions. If the refractive index difference is small, then a higher concentration of domains may be required to achieve sufficient diffusion in one or more directions. If the refractive index difference is large, then fewer domains (lower concentration) are typically required to achieve sufficient diffusion and luminance uniformity. The difference in refractive index between the domains and the matrix may be zero or larger than zero in one or more of the x, y, or z directions.

The refractive index of the individual polymeric domains is one factor that contributes to the degree of light scattering by the film. Combinations of low- and high-refractive-index materials result in larger diffusion angles. In cases where birefringent materials are used, the refractive indexes in the x, y, and z directions can each affect the amount of diffusion or reflection in the processed material. In some applications, one may use specific polymers for specific qualities such as thermal, mechanical, or low-cost, however, the refractive index difference between the materials (in the x, y, or z directions, or some combination thereof) may not be suitable to generate the desired amount of diffusion or other optical characteristic such as reflection. In these cases, it is known in the field to use small domains, typically less than 100 nm in size to increase or decrease the average bulk refractive index. Preferably, light does not directly scatter from these added domains, and the addition of these domains does not substantially increase the absorption or backscatter.

During production of the light filtering directional control element or one of its regions, the refractive index of the domains or the matrix or both may change along one or more axes due to crystallization, stress- or strain-induced birefringence or other molecular or polymer-chain alignment technique.

Additive materials can increase or decrease the average refractive index based on the amount of the materials and the refractive index of the polymer to which they are added, and the effective refractive index of the material. Such additives can include: aerogels, sol-gel materials, silica, kaolin, alumina, fine domains of MgF2 (its index of refraction is 1.38), SiO2 (its index of refraction is 1.46), AlF3 (its index of refraction is 1.33-1.39), CaF2 (its index of refraction is 1.44), LiF (its index of refraction is 1.36-1.37), NaF (its index of refraction is 1.32-1.34) and ThF4 (its index of refraction is 1.45-1.5) or the like can be considered, as discussed in U.S. Pat. No. 6,773,801, the contents incorporated herein by reference. Alternatively, fine domains having a high index of refraction, may be used such as fine particles of titania (TiO2) or zirconia (ZrO2) or other metal oxides.

Other modifications and methods of manufacturing anisotropic light scattering regions, and light emitting devices and configurations incorporating anisotropic light scattering elements are disclosed in U.S. Pat. No. 7,278,775, the contents of which are incorporated by reference herein. The modifications and configurations disclosed therein may be employed in an embodiment of this invention to create a uniform, efficient light fixture comprising a light filtering directional control element.

Anisotropic Scattering Region Location

The light filtering directional control element or a light fixture comprising the light filtering directional control element may comprise one or more anisotropic light scattering regions. On or more of the regions may be located with the lenticular lens structure, within the lenticular lens substrate, within the light absorbing region, within the light reflecting region, within the light transmitting region, within or adhered to the waveguide, between the light filtering directional control element and the light fixture light output surface, between the light filtering directional control element and the waveguide or between the waveguide and one or more light emitting sources such as LED's. The anisotropic light scattering region may be optically coupled to one or more elements of the light filtering directional control element or one or more elements of the light fixture. In one embodiment of this invention, the anisotropic light scattering element is optically coupled to one or more components of the light filtering directional control element or the light fixture using a low refractive index adhesive. In a further embodiment of this invention, a light filtering directional control element comprises an anisotropic light scattering film optically coupled using a pressure sensitive adhesive to the apex region of the lenticules such that the anisotropic light scattering film provides a substantially planar output surface that is more resistant to scratches. In one embodiment, the loss of the refractive power at the apex of the lenticules where the pressure sensitive adhesive effectively index matches out the interface increases the FWHM angular intensity output in a plane perpendicular to the lenticules by less than one selected from the group of 2 degrees, 5 degrees, 10 degrees, or 20 degrees relative to the anisotropic light scattering film separated from the lenticular lens array by an air gap.

In one embodiment of this invention, a light fixture comprises two light filtering directional control elements wherein the lenticules are arranged substantially orthogonal to each other. When a light fixture comprises a first light filtering directional control element on the output side of the light fixture from a second light filtering directional control element wherein the lenticules are arranged substantially orthogonal to each other and the first light filtering directional control element comprises symmetrically diffuse reflecting region, the reflected light will reflectively scatter in a plane parallel to the lenticules, which increases the angular FWHM output profile in that plane. In applications where highly collimated light fixture output profiles in two orthogonal planes are desired, this increase in the FWHM in a plane relative to the output from the second light filtering directional control element is undesirable. In one embodiment of this invention, a light fixture comprises a first light filtering directional control element on the output side of the light fixture from a second light filtering directional control element wherein the lenticules are arranged substantially orthogonal to each other and the first light filtering directional control element comprises an anisotropically reflecting region where the major axis of diffusion is oriented in a plane perpendicular to the lenticules of the first light filtering directional control element and the reflected light will reflectively scatter in a plane perpendicular to the lenticules and maintain the collimation in the plane parallel to the lenticules.

Light Fixture Thickness

In one embodiment of this invention, the light fixture is a direct-lit type. In another embodiment of this invention, the light fixture is an edge-lit type which can generally be made thinner than a direct-lit type. In one embodiment of this invention, the light filtering directional control element increases the uniformity, reduces the thickness and provides increased collimation. In one embodiment of this invention, the light recycling and uniformity derived from the light reflecting region and the spatial filtering from the light transmitting region and lenticular lens array reduces the thickness of an edge-lit light fixture. In one embodiment of this invention, a light fixture comprises at least one LED light source, a waveguide, and a light filtering directional control element and the distance between an outer surface of the waveguide and light output surface of the fixture is less than one selected from the group of 1.5 millimeters, 1 millimeter and 0.5 millimeters.

In a further embodiment of this invention, a fixture comprises a light filtering directional control element (comprising the light output surface of the light fixture), an optical waveguide, and a white diffusely reflecting film opposite the light output side of the waveguide.

In a further embodiment of this invention, a light fixture comprises a light filtering directional control element and a luminaire device disclosed in an embodiment of U.S. Pat. No. 5,594,830, the contents of which are incorporated by reference herein.

Other Films and Components

In one embodiment of this invention, a light filtering directional control element comprises a lenticular lens array, at least one of a light absorbing or light reflecting waveguide designed to direct light along a direction such that the light can effectively be outcoupled from the waveguide spatially such that the uniformity of the light exiting the element is improved when illuminated from the edge. In one embodiment of this invention, a light filtering directional control element comprises a lenticular lens array optically coupled to at least one of a light reflecting region with light transmitting apertures or a light absorbing region with light transmitting apertures, where one region is optically coupled to a waveguide.

In another embodiment of this invention a light fixture comprises a light filtering directional control element and at least one additional collimating element such as a 90 degree apex angle prismatic film. By pre-conditioning the light incident on the light filtering directional control element, more light is transmitted and the FWHM angular output angles of the light fixture along one or more output planes is reduced relative to a light fixture comprising just the light filtering directional control element. In one embodiment of this invention, a light fixture comprises two crossed 90 degree prismatic collimating films and a light filtering directional control element such that the angular width of the FWHM intensity profile within one output plane is less that 15 degrees. In a additional embodiment of this invention, a light fixture comprises two crossed 90 degree prismatic collimating films and a light filtering directional control element such that the angular width of the FWHM intensity profile within one output plane is less that 10 degrees. In another embodiment of this invention, a light fixture comprises two crossed 90 degree prismatic collimating films and a light filtering directional control element such that the FWHM along one output plane is less than 8 degrees. In another embodiment of this invention, a light fixture comprises a light filtering directional control element, a first 90 degree prismatic collimating film and a second 90 degree prismatic film providing brightness enhancement with anisotropic light scattering phase domains dispersed within the substrate as describe in U.S. patent application Ser. No. 11/679,628, the contents of which is incorporated herein by reference. In this embodiment, the angular width of the FWHM intensity profile within one output plane is less than one selected from the group of 8 degrees, 10 degrees, 15 degrees or 20 degrees. In another embodiment of this invention, a light fixture comprises a 90 degree prismatic collimating film disposed above a light filtering directional control element wherein the prisms are oriented substantially orthogonal to the lenticules and further comprises a second 90 degree prismatic film disposed on the opposite side of the light filtering collimating film providing brightness and uniformity enhancement with anisotropic light scattering phase domains dispersed within the substrate and a waveguide and at least one light emitting diode. In one embodiment of this invention, the use of at least one brightness enhancing or collimating film along with a light filtering directional control element which comprises a light absorbing region permits more light to pass through the light filtering directional control element due to the more highly collimated incident light profile upon the light filtering directional control element. In one embodiment of this invention, a light filtering directional control element, or light fixture comprising the same, comprises at least one collimating film selected from the group of BEF, BEF II, BEF III, TBEF, BEF-RP, BEFII 90/24, BEF II 90/50, DBEF-MF1-650, DBEF-MF2-470, BEFRP2-RC, TBEF2 T 62i 90/24, TBEF2 M 65i 90/24, NBEF, NBEF M, Thick RBEF, WBEF-520, WBEF-818, OLF-KR-1, and 3637T OLF Transport sold by 3M, PORTGRAM V7 sold by Dai Nippon Printing Co., Ltd., LUMTHRU that sold by Sumitomo Chemical Co., Ltd. and ESTINAWAVE W518 and W425 DI sold by Sekisui Chemical Co., Ltd.

The light fixture may also comprise a light filtering directional control element and a light re-directing component that re-directs a substantially portion of the light into an off-axis orientation. In one embodiment of this invention, a light fixture comprises a light filtering directional control element and a non-symmetrical prismatic film such as a Image Directing Film (IDF or IDFII) or Transmissive Right Angle Film (TRAF or TRAFII) sold by 3M. In one embodiment of this invention, a wall washing light fixture comprises a light filtering directional control element and a non-symmetrical prismatic film. In one embodiment of this invention, a light fixture comprises a light filtering directional control element and a symmetrical prismatic film to re-distribute the light symmetrically about an axis such as a prismatic film with a 60 degree apex angle with the prisms oriented toward the output surface. In other embodiment of this invention, a light filtering directional control element, or a light fixture comprising the same, comprises a lenticular lens array, a light reflecting region, light transmitting regions, and a linear prism film with an apex angle between 45 degrees and 75 degrees where the substrate of the linear prism film is coupled directly or through another layer to the light reflecting regions with the prisms oriented away from the lenticules. In another embodiment of this invention, the linear prism film is a "reverse prism film" such as sold by Mitsubishi Rayon Co., Ltd. under the trade names of DIA ART H150, H210, P150 and P210, or is a prismatic film of a similar type as disclosed in the embodiments within U.S. Pat. Nos. 6,545,827, 6,151,169, 6,746,130, and 5,126,882, the contents of which are incorporated by reference herein.

In one embodiment of this invention, a light fixture comprises an LED array on a flexible circuit disposed in a circular or arc shape in proximity to a waveguide within a light filtering directional control element or as a separate component from the light filtering directional control element. In one embodiment of this invention, a light fixture comprises a circular array of LED's on flexible circuit such that the light from the LED's is directed inward toward the center of a circular disc-shaped waveguide comprising light extraction elements of at least one type selected from the group of embossed features, laser-ablated features, stamped features, inked surface patterns, injection molded features, etched surface patterns, sand or glass-blasted micro-patterns, uv cured embossing patterns, dispersed phase particle scattering, scattering from region comprising beads, fibers or light scattering or diffracting shapes. In one embodiment of this invention, the light fixture in the previous embodiment further comprises a light filtering directional control element. In this embodiment, the light fixture can perform as a downlight wherein the fixture has a substantially circular disc-like shape.

One or more elements or films within the light fixture or light filtering directional control element may be combined by using adhesives (such as pressure sensitive adhesives), thermally bonding, co-extrusion, insert molding, and other techniques known to combine two polymeric films or elements. In one embodiment of this invention, a light filtering directional control element comprises an element with surface relief structures of a first material with a first refractive index $n_s$ that is at least one of a lenticular lens array and light collimating element wherein the element is physically coupled to second optical element by using second material with a second refractive index $n_c$ such that $n_s - n_c > 0.01$. In this embodiment, the lenticular lens array or collimating element can be physically coupled to another element while still retaining a level of refraction or reflection. In another embodiment, the value $n_s - n_c$ is greater than one selected from the group of 0.05, 0.1, 0.2, 0.4 or 0.5. In one embodiment, the lenticular lens array or collimating element is made of a high refractive index UV curable material (such as known in the optical film industry and described in U.S. Pat. Nos. 6,107,364, 6,355,754, 6,359,170, 6,533,959, 6,541,591, 6,953,623 and international patent application PCT/GB2004/000667, the contents of each are incorporated by reference herein.

In one embodiment of this invention, the light filtering directional control element comprises at least one coating or component selected from the group of anti-reflection coating or film, anti-glare film or coating, tinted film or coating, colored coating or tint, light scattering coating or film, hard-coating or film comprising a hard-coating, housing or element to hold more than one component together, element to enable rotation or translation of one or more elements relative to the other.

In another embodiment of this invention, a light fixture comprises an electrical device for controlling the color (such as individually adjusting the output from a red, green and blue LED), angular light output profile (such as by moving a lens), direction of the light output profile, intensity of the light output, and mode of operation (such as switching between mirror mode or light mode).

Adjustable Light Output Profile

In one embodiment of this invention, at least one of the peak direction or the FWHM of the angular light output profile in one or more output planes of a light fixture is manually or electronically adjustable by rotating one or more of the light filtering directional control element, prismatic collimating film, position of a light source such as an LED or non-symmetric prismatic light re-directing film such as Image Directing Film or Transmissive Right Angle Film, both produced by 3M. In another embodiment of this invention, the peak direction or the FWHM of the angular light output profile of a light fixture comprising an light filtering collimating film is adjustable electronically without any moving parts by using an electronically reconfigurable diffusing element such as a Polymer Dispersed Liquid Crystal element which can be switched from a substantially diffuse state to a substantially clear state by the application of an electric voltage in the regions corresponding to at least one of the light reflecting regions, light absorbing regions, light transmitting regions, or region above the lenticular lens array of a light filtering directional control element. In one embodiment, the light fixture can be electronically controlled to switch from a light output profile of less than 10 degrees FWHM to one that is greater than 40 degrees within at least one light output plane.

Method of Manufacturing the Light Filtering Directional Control Element

In one embodiment of this invention, the light filtering directional control element is manufactured by according to a predetermined design by using traditional manufacturing techniques such as offset lithography, web printing, letterpress, digital printing, and screen printing used for lenticular graphics, prints, images and 3D displays such as known in the art. Methods of manufacturing lenticular prints are disclosed in U.S. Pat. Nos. 7,136,185, 5,573,344, 5,560,799 and Ph.D. thesis by Gary Jacobsen for Dissertation Presented to the Faculty of the School of Engineering of Kennedy-Western University for the Degree of Doctor of Philosophy in Engineering Management titled "FIRST NOVEL INVENTION OF INLINE WEB FED ROLL PRINT MANUFACTURING PRODUCTION OF ANIMATED/THREE DIMENSIONAL IMAGED PRINT PRODUCTS INCORPORATING ADVANCED LENTICULAR TRANSPARENT SUBSTRATE . . . ITS ADVANTAGES AND THE COMPARISON/CONTRAST ORDER ANALYSIS TO PRIOR U.S.P.T.O. PATENTED ART.", the contents of each are incorporated by reference herein. Typically lenticular image prints comprise 2 or more images separated into alternating strips disposed near the focal point of the lenticular lenses to generate two or more views in a stereoscopic or "flip" or other viewing mode. Similarly, light absorbing strips are printed, adhered, transferred or otherwise formed on the light input side of lenticular lens arrays in the projection screen and display industry. Methods for producing the light absorbing stripes or light absorbing regions within bead-based or lenticular screens are disclosed in U.S. Pat. Nos. 5,870,224, 6,307,675, 6,781,733, 6,829,086, 5,563,738, 6,631,030, 5,563,738, 6,896,757, 6,912,089, 5,870,224 and 6,519,087, the contents of each are incorporated by reference herein. Other methods of obtaining light reflecting or light absorbing regions on a substrate or substantially planar surface of a lenticular lens array include thermal transfer such as disclosed in U.S. Pat. No. 4,871,609, the contents of which are disclosed herein by reference. The lenticular print manufacturing or the projection screen manufacturing processes may be altered or steps may be added to produce a light filtering directional control element comprised of a lenticular array or array of surface relief lenses such as beads, at least one of a light absorbing or light reflecting region and a light transmitting region. In one embodiment of this invention, the light reflecting region is formed with a similar process to one of the methods in the aforementioned patents wherein light absorbing particles such as carbon black are replaced with light reflecting particles such as $BaSO_4$ or $TiO_2$. In one embodiment of this invention, a method of producing a light filtering directional control element comprises of forming a layer of light reflecting material on a substrate, subsequently forming a layer of light absorbing material on the light reflecting material, thermally or optically transferring the light absorbing and light reflecting material in selected regions from the substrate to a substantially planar surface of a lenticular or surface relief lens array film such that the light absorbing and light reflecting regions are registered at a predetermined location on the substantially planar side of the lens array.

In another embodiment of this invention, a light filtering directional control element is produced by printing a light absorbing region upon a lenticular lens array in a predetermined linear pattern in registration with the lenticules and subsequently printing a light reflecting region in registration and on top of or spaced apart from the light absorbing region. In another embodiment of this invention, a light filtering directional control element is produced by subsequently coating a light absorbing and light reflecting layer on lenticular substrate and subsequently exposing through the lenticular lens array with infra-red illumination such that the light is focused in regions corresponding to the focal point of the lenticular lenses such that at least one of the following occur: the bond between the light absorbing region and the substrate is broken, the light absorbing material is ablated off of the substrate, the light absorbing material and the light reflecting material is ablated off of the substrate. The light reflecting or light absorbing regions may comprise compositions such as infra-red absorbing dies, adhesion modifiers, light sensitive adhesion modifiers etc. such that the ablation occurs or the bond is broken at a sufficiently low laser power without significantly damaging the lenticular lens surface or the opposite, substantially planar surface. The IR exposure may be from a frequency doubled-YAG laser, a $CO_2$ laser, a bank of collimated infra-red heating lamps or other IR light sources that can be collimated through reflective or refractive optics or have a naturally low beam divergence.

In a further embodiment of this invention, a method of producing a light filtering directional control element comprises forming a layer of light reflecting material on a substrate, subsequently disposing a layer of light absorbing material above the light reflecting material, depositing an array of spherical or substantially spherical beads of a diameter that is at least twice as thick as the combined light reflective and light absorbing regions, and applying pressure to the beads and substrate through the use of stamps, presses, rollers or films on rollers such that the beads are pressed into the light absorbing and light reflecting regions, wherein one or more of the beads is in sufficiently close proximity to the substrate to provide a light transmitting aperture. In a further embodiment of this invention, the light transmitting aperture provided by the bead permits at least 20% of the incident light from the bead side to transmit through the light filtering directional control element. In a further embodiment of this invention, the method of manufacturing a light filtering directional control element further comprises and additional step of thermal, optical, evaporative, or radiation curing which substantially increases the bonding or substantially fixes the location of one or more of the beads. In one embodiment of this invention, the exposed bead side of the light filtering directional control element is further coated with a substantially conformal (or low refractive index) protective sealant and cured (thermally, optically, evaporative, radiation, extrusion coated, etc) such that beads are substantially fixed in their location.

In a further embodiment of this invention, the light filtering directional control element is produced by optically coupling in one or more regions a lenticular or bead-based surface refractive element to at least one of a light absorbing and light reflecting region, and further optically coupling the combined element to at least one of a light collimating film, a prismatic refractive or total internal reflection based film such as a "reverse prism" type film described in U.S. Pat. No. 5,126,882 or IDF or TRAF manufactured by 3M, a symmetrically or anisotropically scattering volumetric or surface relief diffuser, or a waveguide.

In a further embodiment of this invention, a method of producing a light filtering directional control element comprises forming a layer of light reflecting material on a lenticular lens substrate or layer formed thereupon, exposing the light reflecting region with electromagnetic radiation wherein the light reflecting layer is altered to form light transmitting regions in the areas of higher exposure by the process of the voided reflecting materials being heated to a temperature above it's glass transition temperature and the voids collapse, thus increasing the transmission in the region. In a further embodiment, heat is applied to the light reflecting region before or during exposure such that the light exposure required is reduced. Materials suitable to change their transmission due to collapsing voids due to heat or pressure are described in U.S. patent application Ser. No. 10/984,390, the contents of each are incorporated herein by reference. In a further embodiment of this invention the method of manufacturing a light filtering directional control element comprises the step of applying pressure to a lenticular lens element with a light reflecting layer disposed on the opposite side or a layer thereupon of the lenticular lens element than the lenticules such that a sufficient amount of pressure is transferred to the voided light reflecting region to collapse one or more voided regions disposed beneath the apex of the lenticules. In a further embodiment, the resulting light filtering optical element of the previous embodiment has a light transmission greater than 20% in the case of light entering the lenticule side as measured according to ASTM D1003. In a further embodiment, heat is applied to the lenticular lens element during or before the application of the pressure in the aforementioned embodiment.

In a further embodiment of this invention, a method of producing a light filtering directional control element comprises forming or adhering a multi-layer polymeric reflector film on a lenticular lens substrate or layer formed thereupon, exposing the multi-layer polymeric reflector with electromagnetic radiation wherein the light reflecting layer is altered to form light transmitting regions in the areas of higher exposure. In this embodiment, the light reflecting regions may be made more transmissive by the process of annealing (changing the refractive index in one or more directions in one or more layers or regions, ablation (removing one or more layers or regions), swelling or shrinking (expansion or shrinking in the thickness direction of one or more layers or regions such that the wavelengths corresponding to optical interference are shifted closer to the infra-red or UV wavelength spectrum), or deforming (heating the region to a temperature above it's glass transition temperature. Simultaneously applied pressure or heating may be used with one or more of the embodiments described herein for making a light filtering directional control element so as to provide the benefit of at least one of increasing the transmittance in the region, increasing production (or modification) speed, or enable the modification to occur with a lower light intensity such as providing a bias temperature for melting or deforming In another embodiment of this invention, a method of manufacturing a light filtering directional control element comprises the steps of coating beads onto voided light reflecting film such as described herein in the aforementioned voided film patents, applying heat and pressure to the resulting film such that the beads penetrate into the light reflecting film and collapse the voids and decrease the distance between the opposite surface to the beads. In a further embodiment, the resulting light filtering optical element of the previous embodiment has a light transmission greater than 20% in the case of light entering the lenticule side as measured according to ASTM D1003. By using glass beads or beads made from cross-linked materials, the deformation temperature can be selected to be sufficiently greater than the voided material such that when pressure or pressure and heat are applied, the beads will displace the matrix material of the voided film and/or collapse the voids in the voided material. In a further embodiment of this invention, the voided film used in the reflective region is one selected from the group of a biaxially oriented PET film, a biaxially oriented polypropylene and a PTFE film.

In a further embodiment of this invention, the method of producing a light filtering directional control element comprises the step of transferring a light reflecting region onto the substantially planar side of a lenticular lens sheet or layer thereupon by registering and laser printing or using another electrostatic imaging process using a white scattering toner such as produced by Automatic Transfer Inc or is described in U.S. Pat. Nos. 4,855,204, 6,114,077, 6,921,617, and 6,797,447, the contents of which are incorporated by reference herein.

In one embodiment of this invention, the process of producing a light filtering directional control element comprises the step of extrusion embossing (or UV cured embossing) onto or into a light scattering film a lenticular or other lens pattern. In this embodiment, the thickness of the light filtering directional control element is reduced since the light scattering film serves as a substrate of the lenticular lens array. In designs where the light scattering region is disposed between the lenticules and at least one of the light absorbing region and light reflecting region, the total thickness of the light filtering directional control element is reduced. In one embodiment of this invention the process of producing a light filtering directional control element comprises extrusion embossing lenticular lens elements onto an anisotropic light scattering diffuser. The features maybe extrusion embossed into the light scattering film during the production of the light scattering film or as a subsequent step where the features are embossed directly into a region of the light scattering film (including capping or outer regions of sufficient thickness) or a coating applied to the surface of the light scattering film. In another embodiment of this invention, the process of producing a light filtering directional control element comprises the step of extrusion embossing (or UV cured embossing) onto or into a light scattering film a lenticular or other lens pattern on one or both sides of a light scattering region or film.

In one embodiment of this invention, the process of producing a light filtering directional control element comprises the step of applying a UV sensitive material (such as Cromalin by DuPont) to the substantially planar side of a lenticular lens or layer thereupon, exposing through the lenticules with substantially collimated UV light incident substantially normal to the array of lenticules, applying light absorbing or reflecting particles or toner to the UV sensitive material whereupon the exposed regions are less tacky and the particles do not adhere to the UV sensitive materials in the region. In a further embodiment of this invention, the process of producing a light filtering directional control element comprises the step of applying a UV sensitive material to the substantially planar side of a lenticular lens or layer thereupon, exposing through the lenticules with substantially collimated UV light incident at an angle $\beta_2$ from a surface normal to the array of lenticules, applying light absorbing or reflecting particles or toner to the UV sensitive material whereupon the exposed regions are less tacky and the particles do not adhere to the UV sensitive materials in the region. In one embodiment of this invention, $\beta_2$ is greater than one selected from the group of 5 degrees, 10 degrees, 20 degrees, 30 degrees, and 45 degree. By exposing through the lenticules at an angle, the resulting spatial locations of the linear light transmitting regions are displaced relative to UV exposure normal to the array of lenticules and the resulting light filtering directional control element has an angular light output profile wherein the peak is at an angle $\beta_3$ from the normal to the output surface where $\beta_3 > 0$ degrees such that the peak intensity of the output light is off-axis.

In a further embodiment of this invention, the method of producing a light filtering directional control element comprises the step of using a white transfer pigment layer for the light reflecting region on a lenticular lens film such as described in U.S. Pat. No. 5,705,315. Other printing and transfer methods known in the printing industries may also be used.

FIG. 1 illustrates one embodiment of this invention of a light filtering directional control element 100 wherein a first portion of incident light 105 passes through the light transmitting regions 104 and a second portion 106 of incident light is absorbed in the light absorbing regions 103. The light passing through the lenticular substrate 102 and the lenticules 101 has an angular FWHM of a measured from the normal to the light filtering directional control element 100. After refraction from the lenticules 101, the output light 107 is more collimated. The angular FWHM of the light 109 emitted from the light filtering directional control element 100 has an angular FWHM of $\beta$ in the plane perpendicular to the lenticules where $\beta < \alpha$.

Figure 2:
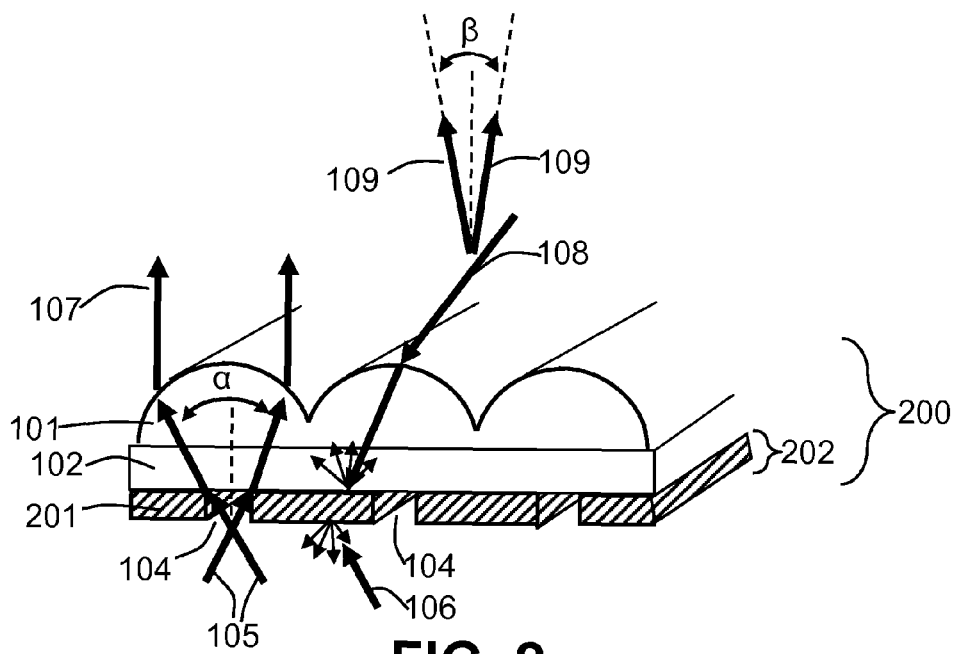
FIG. 2 is a perspective view of a light filtering directional control element of one embodiment of this invention comprising a lenticular lens array, light transmitting regions, and light absorbing regions.

FIG. 2 illustrates an embodiment of this invention of a light filtering directional control element 200 wherein a first portion of incident light 105 passes through the light transmitting regions 104 and a second portion 106 of incident light is reflected and scattered from the light blocking, light reflecting regions 201 in the light transmitting layer 202. The light passing through the lenticular substrate 102 and the lenticules 101 has an angular FWHM of a measured from the normal to the light filtering directional control element 200 in the plane perpendicular to the lenticules. After refraction from the lenticules 101, the output light 107 is more collimated. The angular FWHM of the light 109 emitted from the light filtering directional control element 100 has an angular FWHM of $\beta$ in the plane perpendicular to the lenticules where $\beta < \alpha$.

Figure 3:
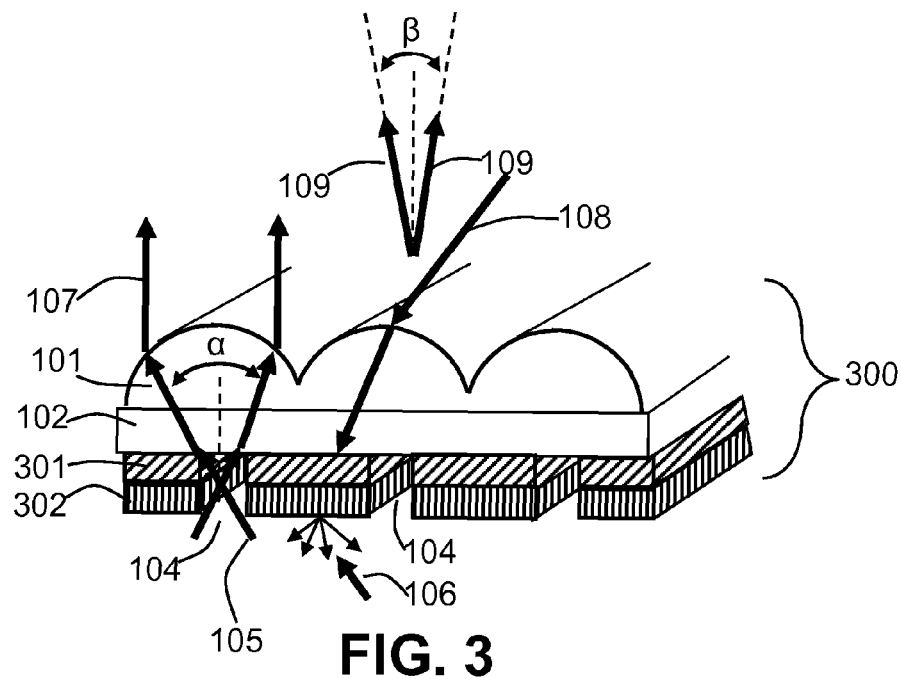
FIG. 3 is a perspective view of a light filtering directional control element of one embodiment of this invention comprising a lenticular lens array, light transmitting regions light absorbing regions and light reflecting regions.

FIG. 3 illustrates another embodiment of this invention of a light filtering directional control element 300 wherein a first portion of incident light 105 passes through the light transmitting regions 104 in a light reflecting region 302 and a light absorbing region 301. A second portion 106 of incident light is reflected and scattered from the light reflecting regions 302. The light passing through the lenticular substrate 102 and the lenticules 101 has an angular FWHM of α measured from the normal to the light filtering directional control element 300 in the plane perpendicular to the lenticules. After refraction from the lenticules 101, the output light 107 is more collimated. The angular FWHM of the light 109 emitted from the light filtering directional control element 100 has an angular FWHM of $\beta$ in the plane perpendicular to the lenticules where $\beta < \alpha$. External light 108 incident upon the light filtering directional control element 300 from the side of the lenticules 101 passes through the lenticules 101 and the lenticular substrate 102 and is absorbed in the light absorbing region 301. In another embodiment of this invention, the portion of incident light on the light reflecting region side of the light filtering directional control element which is not reflected is substantially absorbed by the light absorbing region.

Figure 4:
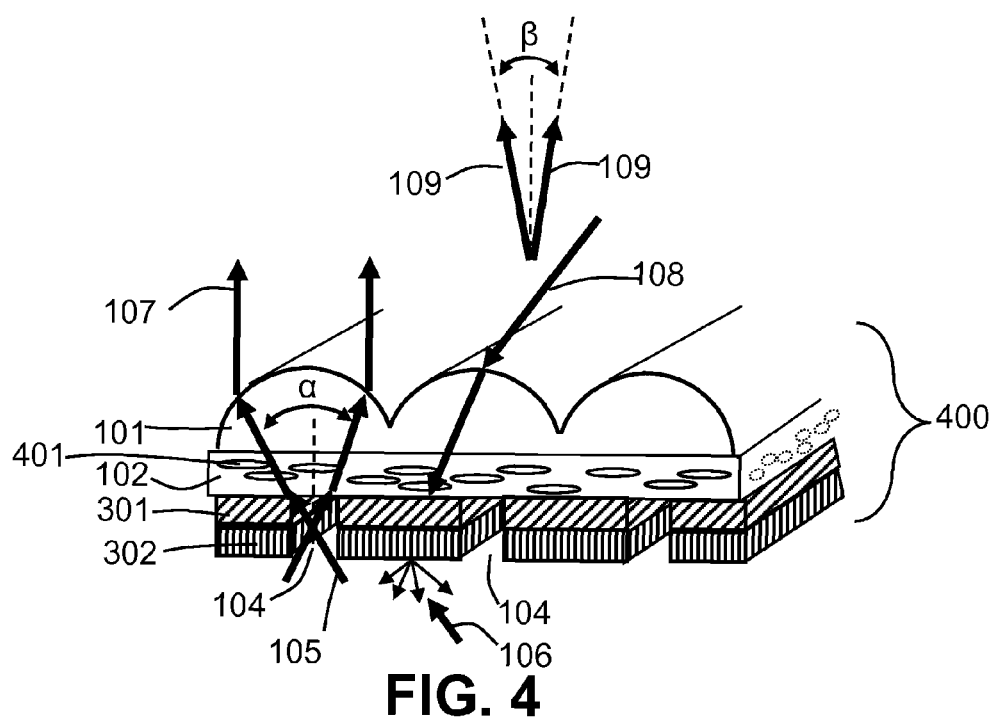
FIG. 4 is a perspective view of a light filtering directional control element of one embodiment of this invention comprising a lenticular lens array, light transmitting regions, light absorbing regions and light reflecting regions and an anisotropic light scattering region disposed in the substrate of the lenticular lens array.

FIG. 4 illustrates another embodiment of this invention of a light filtering directional control element 400 wherein a first portion of incident light 105 passes through the light transmitting regions 104 in a light reflecting region 302 and a light absorbing region 301 and is scattered anisotropically in a plane parallel to the lenticules 101 by asymmetrically shaped dispersed phase domains 401 within the lenticular substrate 102. The light passing through the lenticular substrate 102 and the lenticules 101 has an angular FWHM of α measured from the normal to the light filtering directional control element 400 in the plane perpendicular to the lenticules. After refraction from the lenticules 101, the output light 107 is more collimated. The angular FWHM of the light 109 emitted from the light filtering directional control element 100 has an angular FWHM of $\beta$ in the plane perpendicular to the lenticules where $\beta < \alpha$. A second portion 106 of incident light is reflected and scattered from the light reflecting regions 302. External light 108 incident upon the light filtering directional control element 400 from the side of the lenticules 101 passes through the lenticules 101 and the lenticular substrate 102 and is absorbed in the light absorbing region 301. In another embodiment of this invention, the portion of incident light on the light reflecting region side of the light filtering directional control element which is not reflected is substantially absorbed by the light absorbing region.

Figure 5:
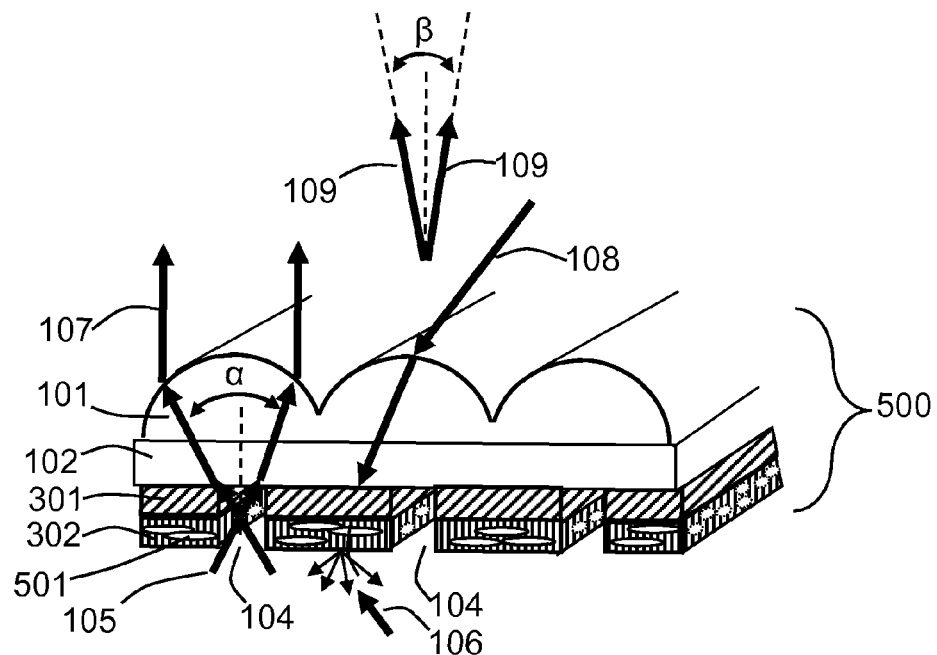
FIG. 5 is a perspective view of a light filtering directional control element of one embodiment of this invention comprising a lenticular lens array, light transmitting regions, light absorbing regions and light reflecting regions comprising asymmetric particles.

FIG. 5 illustrates another embodiment of this invention of a light filtering directional control element 500 wherein a first portion of incident light 105 passes through the light transmitting regions 104 in a light reflecting region 302 and a light absorbing region 301. The light passing through the lenticular substrate 102 and the lenticules 101 has an angular FWHM of a measured from the normal to the light filtering directional control element 500 in the plane perpendicular to the lenticules. After refraction from the lenticules 101, the output light 107 is more collimated. The angular FWHM of the light 109 emitted from the light filtering directional control element 100 has an angular FWHM of $\beta$ in the plane perpendicular to the lenticules where $\beta < \alpha$. A second portion 106 of incident light is anisotropically scattered back from the light reflecting regions 302 comprising asymmetrically shaped dispersed phase domains 501. External light 108 incident upon the light filtering directional control element 500 from the side of the lenticules 101 passes through the lenticules 101 and the lenticular substrate 102 and is absorbed in the light absorbing region 301.

In another embodiment of this invention, the portion of incident light on the light reflecting region side of the light filtering directional control element which is not reflected is substantially absorbed by the light absorbing region. In a further embodiment of this invention, the light reflecting region reflectively scatters light anisotropically into a larger angular FWHM in the plane perpendicular to the lenticules than parallel to the lenticules due to scattering from the asymmetrically shaped disperse phased domains oriented with their larger axis substantially parallel to the lenticules. By reflectively scattering the light more in the plane perpendicular to the lenticules, the light will more likely reach a neighboring light transmitting region through fewer bounces and reflections from the light reflecting region. Since the light reflecting region is less than 100% reflective and some light is either absorbed in the light reflecting region or passes through (into undesirable angles or into a light absorbing region where it can be absorbed), it is desirable for the light to travel through the waveguide such that it will reach a neighboring aperture through a minimal number of reflections from the light reflecting region.

In one embodiment of this invention, a light filtering directional control element comprises a lenticular lens array and a light reflecting region comprising asymmetrically shaped disperse phase domains that reflectively scatter anisotropically such that the angular FWHM of the light scattering in the plane perpendicular to the lenticules is greater than the angular FWHM of the light parallel to the lenticules, and light transmitting regions disposed near the focus of the lenticules such that light transmitted through the light transmitting apertures has a smaller angular FWHM than the light incident on the light filtering directional control element. In a further embodiment, a light fixture comprises the light filtering directional control element of the previously described embodiment.

Figure 6:
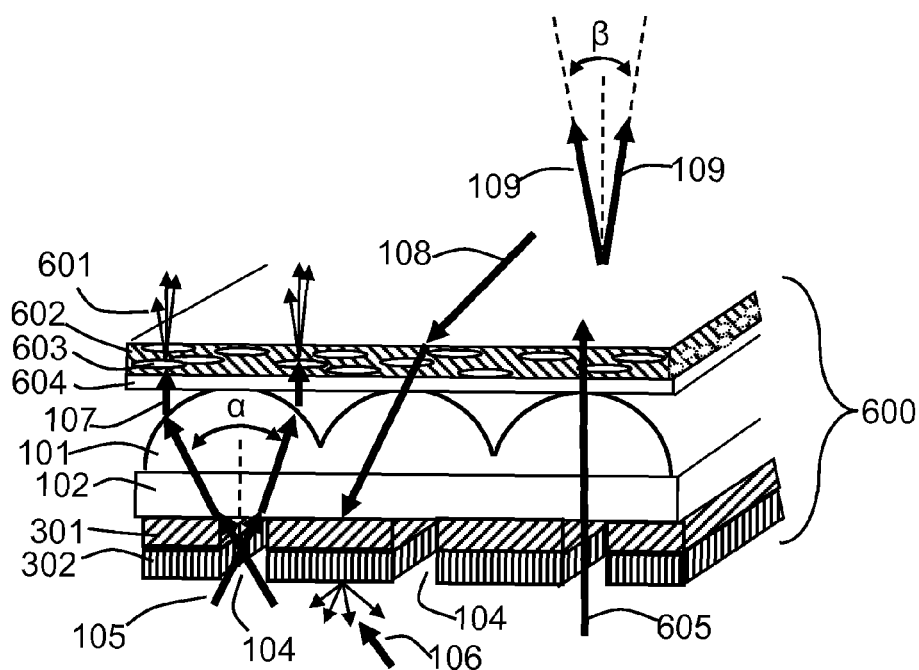
FIG. 6 is a perspective view of a light filtering directional control element of one embodiment of this invention comprising a lenticular lens array, light transmitting regions, light absorbing regions, light reflecting regions and an anisotropic light scattering film adhered to the lenticular lens array.

FIG. 6 illustrates another embodiment of this invention of a light filtering directional control element 600 wherein a first portion of incident light 105 passes through the light transmitting regions 104 in a light reflecting region 302 and a light absorbing region 301. The light passing through the lenticular substrate 102 and the lenticules 101 has an angular FWHM of a measured from the normal to the light filtering directional control element 600 in the plane perpendicular to the lenticules. After refraction from the lenticules 101, the output light 107 is more collimated and passes through an adhesive layer 604 and a anisotropic light scattering region 602 comprising asymmetrically shaped dispersed phase domains. Passing through the anisotropic light scattering region 602 the light 601 is scattering into a larger angular FWHM in a plane parallel to the lenticules. The angular FWHM of the light 109 emitted from the light filtering directional control element 100 has an angular FWHM of β in the plane perpendicular to the lenticules where β<α. A second portion 106 of incident light is reflected and scattered from the light reflecting regions 302. External light 108 incident upon the light filtering directional control element 600 from the side of the lenticules 101 passes through the anisotropic light scattering region 602, the lenticules 101 and the lenticular substrate 102 and is absorbed in the light absorbing region 301. In another embodiment of this invention, the light filtering directional control element 200 of FIG. 2 may be used in the configuration of FIG. 6.

Figure 7:
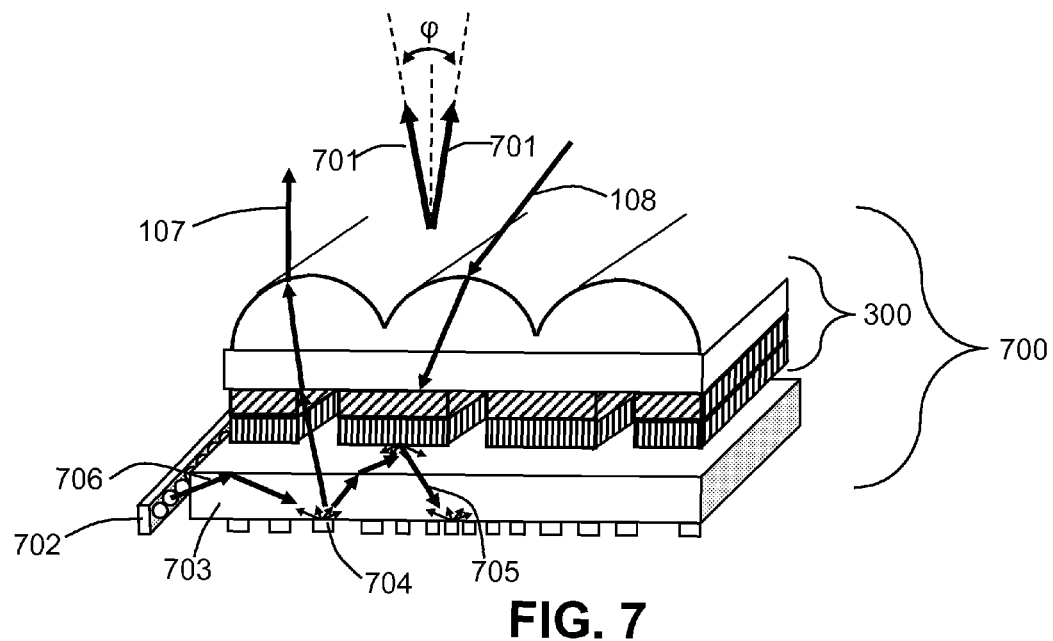
FIG. 7 is a perspective view of an edge-lit light fixture comprising the light filtering directional control element of FIG. 3, an LED array, and a waveguide.

FIG. 7 illustrates another embodiment of this invention of a light fixture 700 comprising the light filtering directional control element 300 of FIG. 3 wherein light 706 emitted from a linear array of LEDs 702 enters a waveguide 703 and is redirected through scattering from a white printed dot light extraction feature 704 such that a portion of the light 107 passes through the light filtering directional control element 300. A second portion 705 of the light reflected or scattered from the light extraction feature 704 is reflected and scattered from the light reflecting regions of the light filtering directional control element 300. The angular FWHM of the light 701 emitted from the light fixture 700 has an angular FWHM of φ in the plane perpendicular to the lenticules of the light filtering directional control element 300 where φ<α. In another embodiment of this invention, the light filtering directional control element 200 of FIG. 2 may be used in the configuration of FIG. 7.

In one embodiment of this invention, a light fixture comprises a linear array of LED's illuminating a waveguide from a least two opposing sides of a waveguide through the edges. In another embodiment of this invention a light filtering directional control element comprises a lenticular lens array disposed on a substrate, light reflecting regions disposed on the other side of the substrate than the lenticules, light transmitting regions disposed to filter and transmit a portion of light incident to the lenticular lens array from the light reflection region side and a waveguide wherein the light reflecting region is adhered to the waveguide and the waveguide comprises at least one selected from the group of light extraction features, an anisotropic light scattering region, and a spatially modified reflective region (departure in one or more regions from a regular linear array of clear apertures to an array of dots for example) to provide increased uniformity and light extraction from the waveguide. In one embodiment of this invention, a light fixture comprises a light filtering directional control element comprising a reflective region that defines light transmitting apertures that vary in length and width in the directions parallel and perpendicular to the lenticules and are disposed substantially near the optical axes of the lenticules such that the light exits the waveguide through the apertures and exits the light fixture within an angular FWHM of less that 70 degrees in at least one output plane.

Figure 8:
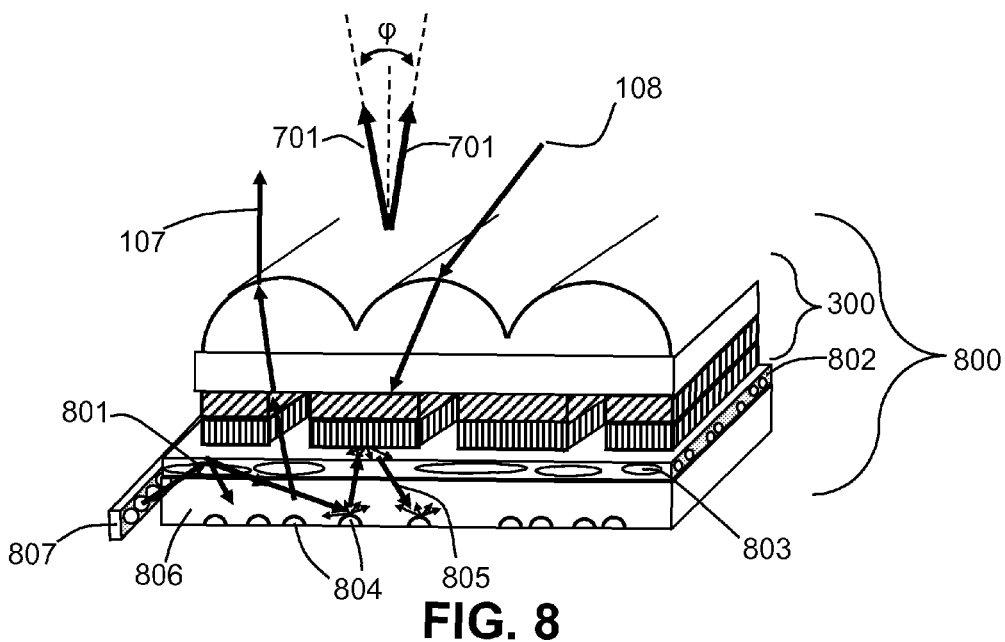
FIG. 8 is a perspective view of an edge-lit light fixture comprising the light filtering directional control element of FIG. 3, an anisotropic light scattering region, a waveguide, and an LED array.

FIG. 8 illustrates another embodiment of this invention of a edge-lit light fixture 800 comprising the light filtering directional control element 300 of FIG. 3, an anisotropic light scattering film 802 optically coupled to a waveguide 806 and an LED array 807. Light 801 emitted from a linear array of LEDs 807 enters the waveguide 806 and is anisotropically scattered in a direction parallel to the LED array 807 by the asymmetrically shaped dispersed phase domains 803 in the anisotropic light scattering film 802 and redirected through reflection or scattering from a light extraction features 804 such that a portion of the light 107 passes through the light filtering directional control element 300. A second portion 805 of the light reflected or scattered from the light extraction feature 804 is reflected and scattered from the light reflecting regions of the light filtering directional control element 300. The angular FWHM of the light 701 emitted from the light fixture 800 has an angular FWHM of φ in the plane perpendicular to the lenticules of the light filtering directional control element 300 where φ<α. In another embodiment of this invention, the light filtering directional control element 200 of FIG. 2 may be used in the configuration of FIG. 8.

Figure 9:
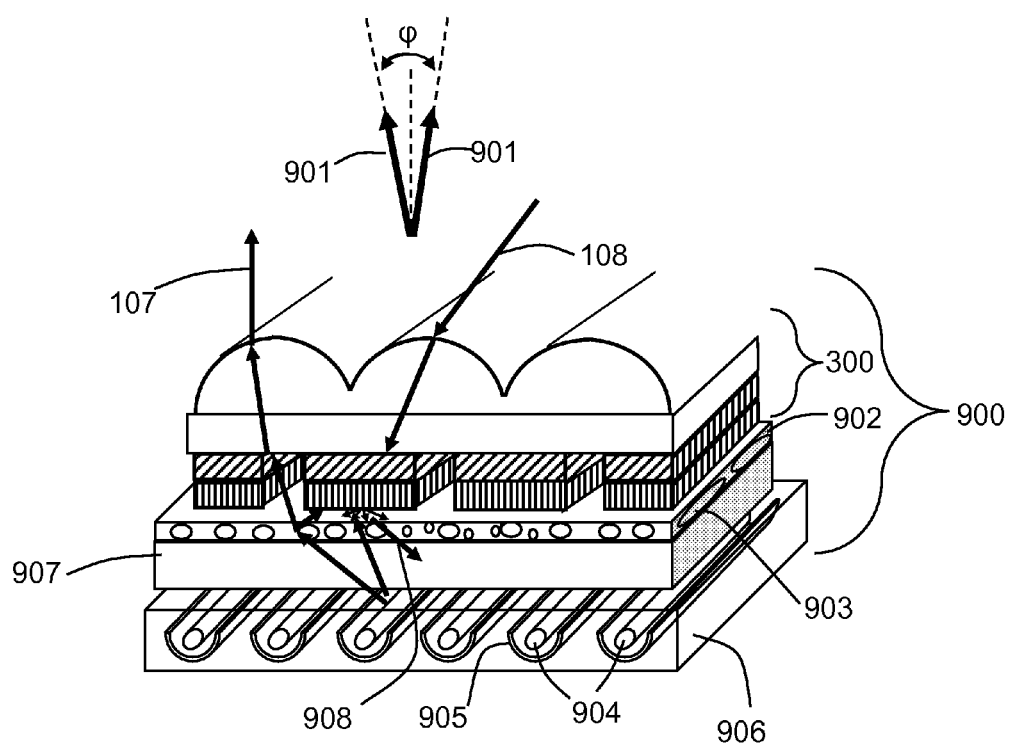
FIG. 9 is a perspective view of a direct-lit light fixture comprising the light filtering directional control element of FIG. 3, an anisotropic light scattering region, a substrate, and an array of fluorescent bulbs.

FIG. 9 illustrates another embodiment of this invention of a direct-lit light fixture 900 comprising the light filtering directional control element 300 of FIG. 3, an anisotropic light scattering film 902 optically coupled to a substrate 907 and an LED array 807. Light 801 emitted from a linear array of LEDs 807 enters the waveguide, a reflective housing 906, and an array of substantially parallel cold cathode fluorescent lamps 904 with reflective regions 905 beneath the lamps. A portion of the light 107 emitted from the cold cathode fluorescent lamps 904 passes through the substrate 907 and is anisotropically scattered in a direction perpendicular to the array of fluorescent lamps 904 by the asymmetrically shaped dispersed phase domains 903 in the anisotropic light scattering film 902 and passes through the light filtering directional control element 300. A second portion 908 of the light from the cold cathode fluorescent lamps passes through the substrate 907 and is anisotropically scattered in a direction perpendicular to the array of fluorescent lamps 904 by the asymmetrically shaped dispersed phase domains 903 in the anisotropic light scattering film 902 and is reflected and scattered from the light reflecting regions of the light filtering directional control element 300. The anisotropic light scattering film efficiently increases the spatial luminance uniformity in the direction perpendicular to the cold cathode fluorescent lamps. The angular FWHM of the light 901 emitted from the light fixture 900 has an angular FWHM of φ in the plane perpendicular to the lenticules of the light filtering directional control element 300 where φ<α. In another embodiment of this invention, the light filtering directional control element 300 of FIG. 2 may be used in the configuration of FIG. 9. In another embodiment of this invention the lenticules are arranged perpendicular to the cold cathode fluorescent lamps.

In one embodiment of this invention, a direct lit light fixture comprises an array of LED's illuminating a light filtering directional control element comprising an anisotropic light scattering region, a light reflecting region and an array of light lenticular lenses.

Figure 10:
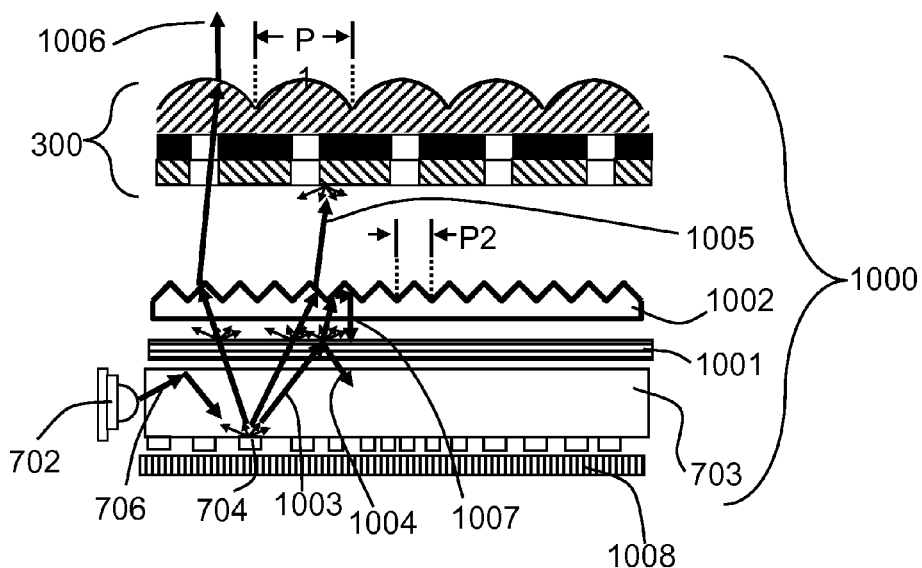
FIG. 10 is a cross-sectional side view of an edge-lit light fixture comprising the light filtering directional control element of FIG. 3, a light collimating element, a diffuser, a waveguide, a white reflector film, and an array of LED's.

FIG. 10 illustrates one embodiment of this invention of a light fixture 1000 comprising the light filtering directional control element 300 of FIG. 3, a light collimating element 1002 with linear prismatic features with 90 degree apex angles, a diffuser 1001, a waveguide 703, a white reflector film 1008, and a linear array of LEDs 702 comprising an array of LEDs. Light 706 emitted from the linear array of LEDs 702 enters a waveguide 703 and is redirected through scattering from a white printed dot light extraction feature 704 such that a portion of the light 1006 passes through the diffuser 1001, the light collimating element 1002 and the light filtering directional control element 300. A portion of light 1005 is scattered from the white printed dot light extraction feature 704 is scattered by the diffuser 1001, and is re-directed by the collimating element 1002 and is reflected by the light reflecting region in the light filtering directional control element 300. Light 1003 is scattered from the white printed dot light extraction feature 704 and a portion of this light 1004 is reflectively scattered by the diffuser 1001. A second portion of the light 1007 that is scattered from the white printed dot light extraction feature 704 and the diffuser 1002 totally internally reflects (TIR) and is redirected back to the waveguide. A portion of the light 1004 scattered from the extraction features 704 is reflectively scattered from the diffuser 1002 back into the waveguide 703. The light filtering directional control element 300 comprises a lenticular lens array surface of a first pitch P1 and the light collimating element has a second pitch P2. In one embodiment of this invention, P2/P1=1/(N+0.5) where N is an integer. The light filtering directional control element of this invention can achieve higher level of collimation (smaller angular FWHM) than a prismatic film such as a light collimating prismatic film with 90 degree apex angles. Light oriented at large angles to the light filtering directional control element has a lower percentage chance of passing through the light transmitting regions because of the finite thickness of at least one of the light absorbing and light reflecting regions. By reducing the angular FWHM of the light incident on the light filtering directional control element the throughput is higher and the optical flux output is greater. One technique for reducing the angular FWHM of the light incident on the light filtering directional control element is to use a light collimating element such as a 90 degree linear prismatic film with the prisms oriented substantially parallel to the lenticules. In one embodiment of this invention, a light fixture comprises a light filtering collimating film and a "reverse prism" film is disposed between the light reflecting regions and a waveguide with the prisms oriented toward the waveguide in order to produce a more collimated input to the light filtering directional control element.

Figure 11:
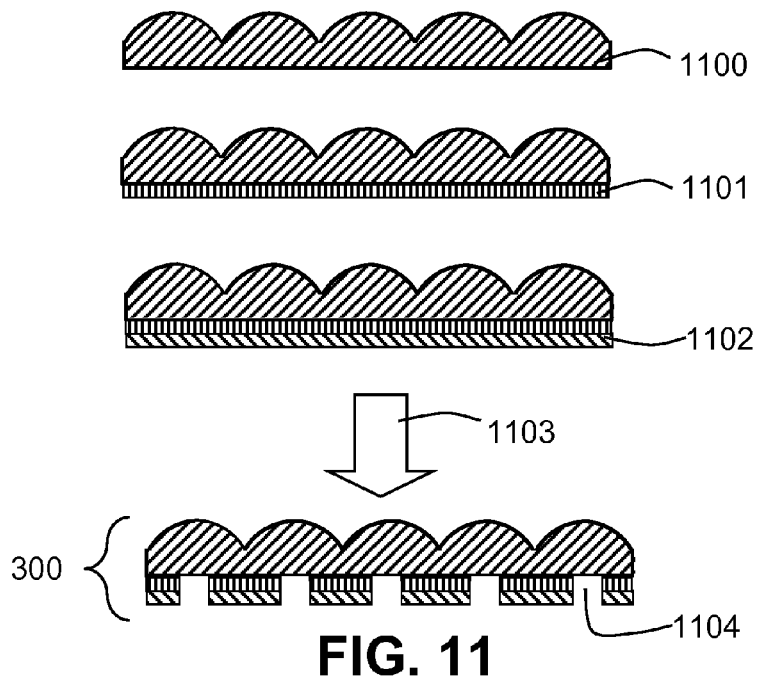
FIG. 11 is a cross-sectional side view illustration of a method of making a light filtering directional control element by coating a light reflecting and light absorbing region and laser ablation.

FIG. 11 illustrates one embodiment of this invention of a method for producing the light filtering directional control element 300 of FIG. 3. A lenticular lens film 1100 is coated with a thin layer of a light absorbing material 1101 such as carbon black particles dispersed in a UV curable or evaporative based (solvent cured) ink. After curing the light absorbing material 1101 a thin layer of a light reflecting material 1102 such as barium sulfate particles dispersed in a UV curable or evaporative based (solvent cured) ink is coated on the light absorbing material 1101. Substantially collimated infra-red light 1103 from a frequency-doubled YAG laser is directed through the lenticular and near the focal regions such that the intensity of the irradiation is sufficient enough to ablate the light absorbing material from the lenticular substrate and carry the corresponding light reflecting region from it, thus creating light transmitting regions 1104.

Figure 12:
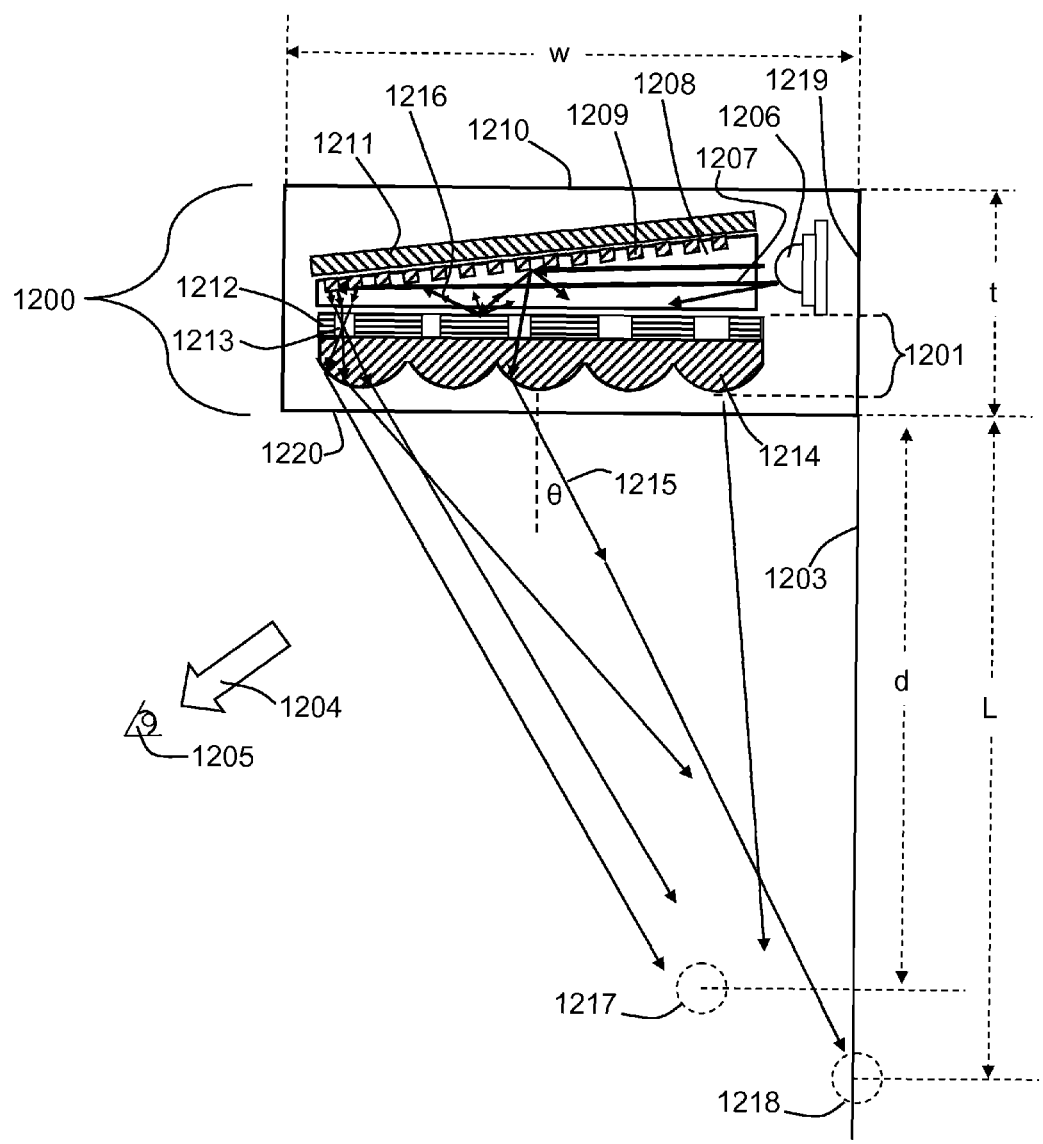
FIG. 12 is a cross-sectional side view of an edge-lit wall washing light fixture comprising a light filtering directional control element with off-axis light output.

FIG. 12 illustrates one embodiment of this invention of a wall-washing light fixture 1200 comprising a light filtering directional control element 1201 designed to redirect light off-axis. The light fixture 1200 comprises an LED array 1206, a waveguide 1208 with light extraction features 1209, a white reflector film 1211, light reflecting regions 1212, light transmitting regions 1213, and a lenticular lens film 1214 within a housing 1210. Light 1207 from an LED array 1206 is directed into a waveguide 1208 where it is extracted by the light extraction features 1209. A portion of the light 1215 extracted from the waveguide 1208 passes through one of the light transmissive regions 1213 which are disposed off-axis to the lenticules in the lenticular lens film 1214 such that upon refracting from the lenticule it is directed away from the normal to the output surface by an angle of θ. A portion of the light 1216 extracted from the waveguide 1208 reflect and scatters from the light reflecting region 1212 back toward the waveguide 1208. The white reflector film 1211 diffusely reflects light that is not contained within the waveguide 1208 and is directed toward the white reflector film 1211. The light 1215 from the light fixture will be more efficiently directed toward a wall 1203 in a wall washing application due to the off-axis re-direction from the light filtering directional control element. As a result, less light 1204 is directed directly from the output surface 1220 toward an undesirable location in the room such as a into a person's eyes 1205. In one embodiment of this invention, the far-field light output has a far-field focal point 1217 at a distance, d, from the light output surface 1220.

In one embodiment of this invention, a light emitting device 1200 comprises a light filtering directional control element 1201 and the thickness of the device, t, is less than 20 millimeters thick. In a further embodiments, the thickness is less than 10 millimeters, 8 millimeters or 5 millimeters. In one embodiment of this invention, the light emitting device is a wall washing light fixture comprises a first side 1219 disposed to be coupled to a wall. In a further embodiment, the distance, L, along a line parallel to the first side 1219 from the light emitting device output surface 1220 to the point of peak luminance 1218 is greater than 20 centimeters. In one embodiment, the thickness of the light emitting device is less than 10 millimeters and the distance along the line parallel to the first side 1219 from the output surface 1220 to the point of peak illuminance 1218 is greater than 20 centimeters. In a further embodiment, d is equal to L.

The light filtering directional control element of one embodiment of this invention enables the light to be directionally controlled toward a specific off-axis positive far-field focal point and have a point of peak illuminance relative to the output surface that results in a more uniform illuminance distribution upon a surface such as a wall at an angle to the output surface of the light emitting device. In some embodiments of this invention, the light filtering directional control element permits the thickness of the light emitting device relative to the width of the device to be reduced. In some embodiments of this invention, the thickness of the light emitting device comprising a light filtering directional control element can be reduced relative to the distance, L. In a further embodiment of this invention, the light emitting device has a width, w, such that $$\frac{w}{t} > 5 \text{ or } \frac{w}{t} > 10 \text{ or } \frac{w}{t} > 20.$$

In a further embodiment of this invention $$\frac{L}{t} > 5 \text{ or } \frac{L}{t} > 10 \text{ or } \frac{L}{t} > 20 \text{ or } \frac{L}{t} > 50.$$

Figure 13:
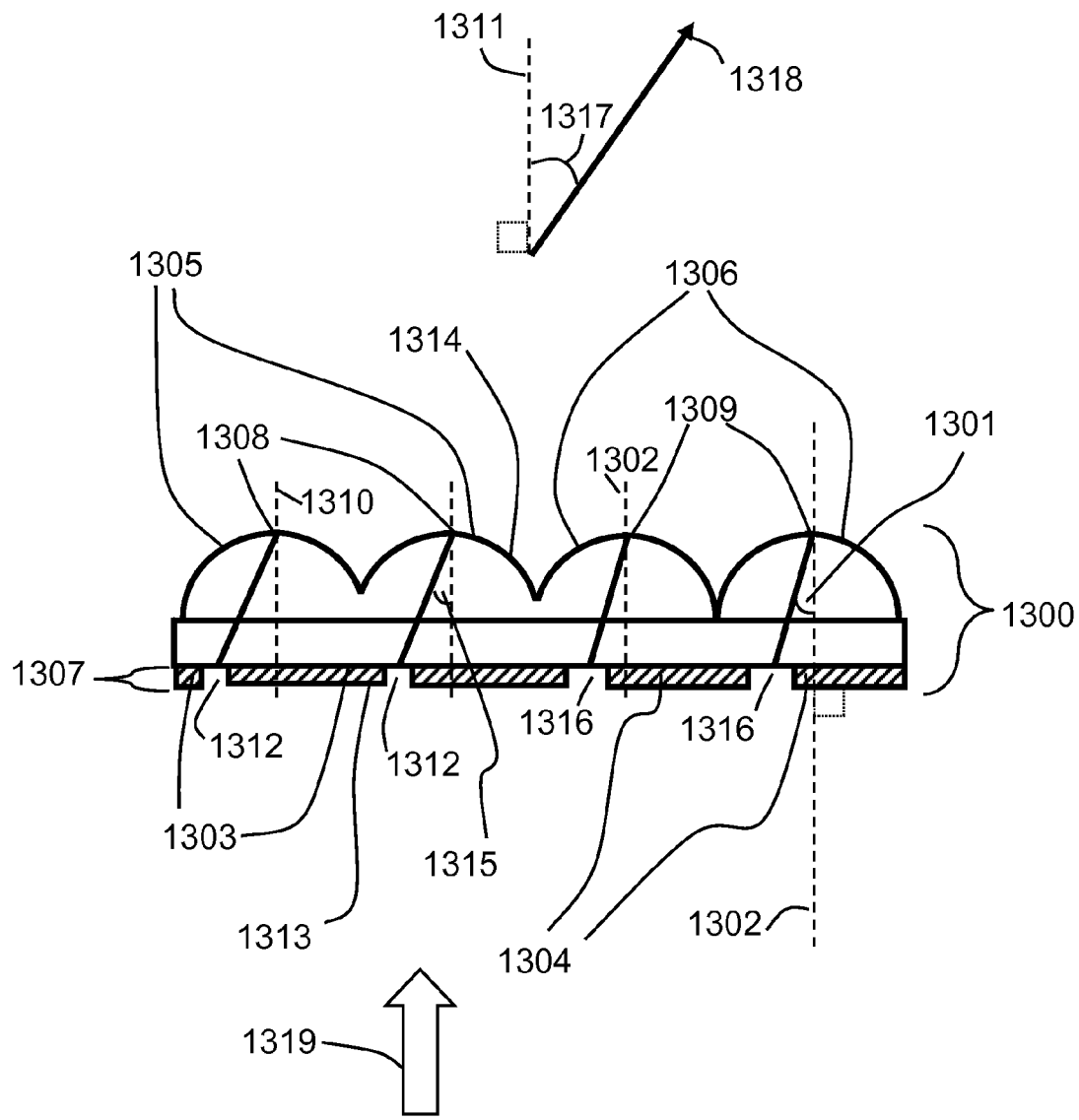
FIG. 13 is a cross-sectional side view of a light filtering directional control element with two groups of lenticular elements.

FIG. 13 illustrates another embodiment of this invention of a light filtering directional control element 1300 comprising a light input surface 1313, a light output surface 1314, first light transmitting regions 1312 and first light blocking regions 1303 disposed within a light transmitting layer 1307, a first group of lenticular elements 1305 with first lenticular apexes to 1308 and first optical axes 1310. The light transmitting layer 1307 is disposed in an optical path between the input surface 1313 and the first group of lenticular elements 1305 and the first light blocking regions 1303 intersect the first optical axes 1310 of the first group of lenticular elements 1305. The first angle gamma 1315 is defined as the angle of the lines formed between the first lenticular apexes 1308 of the first group of lenticular elements 1305 and the centers of the first light transmitting regions 1312 from the first optical axes 1310 of the first group of lenticular elements 1305. The light filtering directional control element 1300 further comprises second light transmitting regions 1316 and second light blocking regions 1304 disposed within the light transmitting layer 1307, a second group of lenticular elements 1306 with second lenticular apexes 1309 and second optical axes 1302. The second angle delta 1301 is defined as the angle of the lines formed between the second lenticular apexes 1309 of the second group of lenticular elements 1306 and the centers of the second light transmitting regions 1316 from the second optical axes 1302 of the second group of lenticular elements 1306. In one embodiment of this invention gamma is not equal to delta. In a further embodiment of this invention, first angle gamma 1315 is greater than 20 degrees. In a further embodiment of this invention, the first light transmitting regions 1312 are disposed in the light transmitting layer 1307 such that they are directly beneath the intersection of the lenticular elements within the first group of lenticular elements 1305. In a further embodiment of this invention, the second group of light blocking regions are disposed to intersect the optical axes of the second group of lenticular elements and gamma is greater than 5 degrees. In one embodiment of this invention, delta is less than 5 degrees and the second light transmitting regions intersect the second optical axes. In a further embodiment of this invention, the optical element has a positive far-field focal distance from the output surface.

In a further embodiment of this invention, the peak angle of illuminance 1318 from light 1319 incident upon the light filtering collimating element 1300 is at a first angle theta 1317 from the normal 1311 to the light output surface 1314 and theta is greater than 0 degrees. In another embodiment of this invention, the first light transmitting layer has a diffuse reflectance measured in the d/8 geometry with the specular component included of greater than 70%. In another embodiment of this invention, the light blocking region is a light reflection region and the diffuse reflectance of the light reflecting region, DR, is greater than 70% as calculated by $$DR = \frac{DRT}{(1 - ART)}$$

where DRT is the total diffuse reflectance of the light transmitting layer measured in the d/8 geometry with the specular component included and ART is the percentage area ratio of the total of the light blocking and light transmitting regions that is occupied by the light transmitting region.

In another embodiment of this invention, the first light blocking regions absorb light and the diffuse reflectance of the light transmitting layer measured in the d/8 geometry with the specular component included is less than 20%. In one embodiment of this invention, the first light blocking regions are light absorbing regions and the light transmitting layer further comprises light reflecting regions disposed substantially in-between the light absorbing regions and the input surface. In one embodiment of this invention, the light reflecting regions comprise a volumetric anisotropic light scattering element.

In a further embodiment of this invention, the pitch of the first group of lenticular elements is equal to the pitch of the second group of lenticular elements and the width of the first light transmitting regions is not equal to the width of the second light transmitting regions in a first direction orthogonal to the first optical axes.

In one embodiment of this invention, a light fixture comprising the light filtering directional control element has a peak angle of illuminance greater than 0 degrees from the light output surface. In a further embodiment of this invention, A light fixture comprising the light filtering directional control element of one embodiment of this invention has a light output profile resembling a batwing profile with peak angles greater than 50 degrees from the normal to the light output surface.

In one embodiment of this invention the light filtering directional control element comprises: an input surface; an output surface; first light transmitting regions; first light blocking regions; lenticular elements formed in a first light transmitting material; a first group of lenticular elements with first lenticular apexes and first optical axes; a light transmitting layer disposed in an optical path between the input surface and the first group of lenticular elements comprising the first light blocking regions disposed in-between the first light transmitting regions; a first angle gamma, defined as the angle between the line formed between the apexes of the first group of lenticular elements and the center of the light transmitting regions and the optical axes of the first group of lenticular elements; a waveguide comprising light extraction features disposed to receive light from the input surface and transmit light to the first light transmitting layer; wherein the first group of light blocking regions are disposed to intersect the optical axes of the first group of lenticular elements and gamma is greater than 5 degrees. In a further embodiment of this invention, a light fixture comprises the light filtering directional control element of the previous embodiment with a peak angle of illuminance greater than 0 degrees from the light output surface.

In one embodiment of this invention, the light filtering directional control element 1201 of FIG. 12 may be replaced by the light filtering directional control element 300 of FIG. 3 such that ambient light is absorbed, the portion of light that passes through the light reflecting region is absorbed and the light fixture has a dark or black appearance and does not emit or reflect stray light from the fixture.

Particular embodiments of the present invention are illustrated in the following Example(s). The following examples are given for the purpose of illustrating the invention, but not for limiting the scope or spirit of the invention.

Example 1

An optical element is made from a 187 micron lenticular lens array film printed on the flat side with linear array of white lines using a laser transfer process. The white lines were aligned substantially parallel to the lenticules and in the regions directly beneath the apex of the lenticules. The white lines are approximately 100 μm wide with a pitch of approximately 187 μm. The optical element is positioned above an edge-lit waveguide with light extraction features and a white PET-based reflector on the opposite side. The light output from the resulting light emitting device has far-field peak illuminance angles greater than 30 degrees from the normal.

Example 2

An optical element is made from a 187 micron lenticular lens array film laminated with Cromalin light sensitive film from DuPont Inc. Collimated UV light from a 1 kW Tamarack UV exposure system is directed to the lenticular film at angle of 15 degrees from the normal to the film such that the light passes through the lenticular elements and exposes the Cromalin light sensitive film. The protective cover is removed from the Cromalin and white titanium dioxide powder is then applied by soft brush to the cromalin film. The film is then blanket UV cured to fully cure the Cromalin. When the optical element is positioned on a diffuser sheet which is directly illuminated by LEDs with the light incident on the light reflecting surface, the far-field peak angle of illuminance is at 15 degrees and light is visible in the angular ranges corresponding to light passing through the white regions.

Example 3

An optical element is made from a 187 micron lenticular lens array film laminated with Cromalin light sensitive film from DuPont Inc. Collimated UV light from a 1 kW Tamarack UV exposure system is directed to the lenticular film at angle of 15 degrees from the normal to the film such that the light passes through the lenticular elements and exposes the Cromalin light sensitive film. The protective cover is removed from the Cromalin and carbon black powder is then applied by soft brush to the Cromalin film. The film is then blanket UV cured to fully cure the Cromalin. A second layer of Cromalin film is laminated to the first Cromalin film. The optical element is then exposed similarly with collimated UV light directed at 15 degrees. The protective cover is removed from the Cromalin and white titanium dioxide powder is then applied by soft brush to the second layer of Cromalin film. The film is then blanket UV cured to fully cure the Cromalin. This resulted in an optical element with black regions disposed in-between the lenticular elements and the white reflecting regions. When the optical element is positioned on a diffuser sheet which is directly illuminated by LEDs with the light incident on the light reflecting surface, the far-field peak angle of illuminance is at 15 degrees and light is not visible in the angular ranges corresponding to light passing through the white and black regions.

Example 4

An optical element is made from a 187 micron lenticular lens array film laminated with Cromalin light sensitive film from DuPont Inc. A temporary light blocking mask is placed on a portion of the lenticular film, leaving a first region comprising a first group of lenticular elements exposed. Collimated UV light from a 1 kW Tamarack UV exposure system is directed to the lenticular film at angle of 0 degrees from the normal to the film such that the light passes through the lenticular elements and exposes the Cromalin light sensitive film. The light blocking mask is moved such that it exposes a middle, second region of the film while blocking light from reaching the first and a third regions of the film. The film is further exposed to UV light at an angle of 15 degrees from the normal toward the first region. The light blocking mask is then moved such that it exposes the third region of the film while blocking light from reaching the first and a second regions of the film. The film is further exposed to UV light at an angle of 30 degrees from the normal toward the first region. The protective cover is removed from the Cromalin and white titanium dioxide powder is then applied by soft brush to the cromalin film. The film is then blanket UV cured to fully cure the Cromalin. When the optical element is positioned on a diffuser sheet which is directly illuminated by LEDs with the light incident on the light reflecting surface, the far-field peak angle of illuminance is at 15 degrees and the light output has a positive far field focal point closer to the first region than the third region of the film.

EQUIVALENTS

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof.

What is claimed is:
1. An optical element comprising:
a) an input surface;
b) an output surface;
c) A light transmitting layer having disposed within a pattern of first light transmitting regions and first light blocking regions; wherein the light blocking region is a light reflecting region and the diffuse reflectance of the light reflecting region, DR, is greater than 70% as calculated by

$$DR = \frac{DRT}{(1 - ART)}$$

where DRT is the total diffuse reflectance of the light transmitting layer measured in the d/8 geometry with the specular component included and ART is the percentage area ratio of the total of the first light blocking regions and first light transmitting regions that is occupied by the first light transmitting region;

d) a light redirecting layer containing a first group of lenticular elements formed in a light transmitting material with lenticular apexes and first optical axes;

e) a first angle gamma, defined as the angle between two vectors extending from an apex of the first group of lenticular elements;
  i) the first vector being parallel to the optical axis;
  ii) the second vector extending toward the center of the nearest first light transmitting region within the first light transmitting layer;

f) wherein the optical path of light transmitted through the output surface proceeds in sequence from the input surface through the first light transmissive layer through the light redirecting layer and;
  the first group of light blocking regions are disposed to intersect the optical axes of the first group of lenticular elements and gamma is greater than 5 degrees.

2. The optical element of claim 1 wherein gamma is greater than 20 degrees.

3. The optical element of claim 2 wherein the first light transmitting regions are disposed in the light transmitting layer such that they cover the area directly beneath the intersection of the lenticular elements within the first group of lenticular elements.

4. The optical element of claim 1 wherein the first light transmitting layer has a diffuse reflectance measured in the d/8 geometry with the specular component included of greater than 70%.

5. The optical element of claim 1 wherein the first light blocking regions are light absorbing regions and the light transmitting layer further comprises light reflecting regions disposed substantially in-between the light blocking regions and the input surface.

6. The optical element of claim 1 wherein the light redirecting layer comprises a volumetric anisotropic light scattering element optically coupled to the first group of lenticular elements.

7. A light emitting device comprising the optical element of claim 1 with a peak angle of illuminance greater than 0 degrees from the light output surface.

8. The optical element of claim 1 further comprising:
a) a second group of lenticular elements formed in the light redirecting layer with second lenticular apexes and second optical axes;
b) second light blocking regions and second light transmitting regions disposed in a pattern within the first light transmitting layer;
c) an angle delta, defined as the angle between two vectors extending from an apex of the second group of lenticular elements;
  i) the first vector being parallel to the optical axis;
  ii) the second vector extending toward the center of the nearest second light transmitting region within the first light transmitting layer;
wherein gamma is not equal to delta.

9. The optical element of claim 8 wherein the second group of light blocking regions are disposed to intersect the second optical axes of the second group of lenticular elements and gamma is greater than 5 degrees.

10. The optical element of claim 8 wherein delta is less than 5 degrees and the second light transmitting regions intersect the second optical axes.

11. The optical element of claim 8 wherein the far-field focal distance of the optical element from the output surface is positive and less than a first linear dimension of the output surface.

12. The optical element of claim 8 wherein the far-field focal distance of the optical element from the output surface is positive and greater than a first linear dimension of the output surface.

13. A light emitting device comprising the optical element of claim 8 wherein the peak angle of illuminance is at an angle theta from the normal to the light output surface and theta is greater than 0 degrees.

14. The light emitting device of claim 13 wherein the light emitting device is a wall-washing light fixture.

15. The light emitting device of claim 14 further comprising a first side disposed to be coupled to a wall wherein the thickness, t, of the light emitting device is less than 10 millimeters and the distance along the line parallel to the first side from the output surface to the point of peak illuminance is greater than 20 centimeters.

16. The optical element of claim 8 wherein the pitch of the first group of lenticular elements is equal to the pitch of the second group of lenticular elements and the width of the first light transmitting regions is not equal to the width of the second light transmitting regions in a first direction orthogonal to the first optical axes.

17. An optical element comprising:
a) an input surface;
b) an output surface;
c) A light transmitting layer having disposed within a pattern of first light transmitting regions and first light blocking regions; wherein the light blocking region is a light reflecting region and the diffuse reflectance of the light reflecting region, DR, is greater than 70% as calculated by $$DR = \frac{DRT}{(1-ART)}$$

where DRT is the total diffuse reflectance of the light transmitting layer measured in the d/8 geometry with the specular component included and ART is the percentage area ratio of the total of the first light blocking regions and first light transmitting regions that is occupied by the first light transmitting region;

d) a light redirecting layer containing a first group of lenticular elements formed in a light transmitting material with lenticular apexes and first optical axes;

e) a first angle gamma, defined as the angle between two vectors extending from an apex of the first group of lenticular elements;
  i) the first vector being parallel to the optical axis;
  ii) the second vector extending toward the center of the nearest first light transmitting region within the first light transmitting layer;

f) a waveguide comprising light extraction features disposed to receive light from the input surface and transmit light to the first light transmitting layer;

g) wherein the optical path of light transmitted through the output surface proceeds in sequence from the input surface through the first light transmissive layer through the light redirecting layer and;
  the first group of light blocking regions are disposed to intersect the optical axes of the first group of lenticular elements and gamma is greater than 5 degrees.

18. A light fixture comprising the optical element of claim 17 with a peak angle of illuminance greater than 0 degrees from the light output surface.

* * * * *